US012774802B2

(12) United States Patent
Mutchler et al.

(10) Patent No.: US 12,774,802 B2
(45) Date of Patent: Oct. 27, 2026

(54) LIGHT ASSEMBLY FOR USE WITH A STORAGE SYSTEM

(71) Applicant: MILWAUKEE ELECTRIC TOOL CORPORATION, Brookfield, WI (US)

(72) Inventors: Gregory A. Mutchler, Milwaukee, WI (US); Chelsea L. Rubietta, Oak Creek, WI (US); Gregory D. Wiessler, New Berlin, WI (US); Jason W. Isaacs, Delafield, WI (US); Duane W. Wenzel, Mukwonago, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 19/062,223

(22) Filed: Feb. 25, 2025

(65) Prior Publication Data

US 2025/0271125 A1 Aug. 28, 2025

Related U.S. Application Data

(60) Provisional application No. 63/558,836, filed on Feb. 28, 2024.

(51) Int. Cl.

| | |
|---|---|
| ***F21V 21/22*** | (2006.01) |
| ***F21V 33/00*** | (2006.01) |
| *B25H 3/02* | (2006.01) |

(52) U.S. Cl.

CPC .......... *F21V 21/22* (2013.01); *F21V 33/0084* (2013.01); *B25H 3/02* (2013.01)

(58) Field of Classification Search

CPC ........................................................ F21V 21/22

See application file for complete search history.

(56) References Cited

U.S. PATENT DOCUMENTS

| | | | | |
|---|---|---|---|---|
| 7,322,716 B1 | 1/2008 | Atkinson | | |
| 8,104,934 B2 | 1/2012 | Probasco | | |
| 10,962,218 B2 | 3/2021 | Plato et al. | | |
| 2008/0049416 A1* | 2/2008 | Fisherman | ............ | B42D 3/123 362/198 |

(Continued)

FOREIGN PATENT DOCUMENTS

| | | |
|---|---|---|
| CN | 101868759 A | 10/2010 |
| CN | 105082096 B | 11/2016 |
| CN | 111404223 A | 7/2020 |

(Continued)

OTHER PUBLICATIONS

Extended European Search Report for Application No. 25160960.8 dated Aug. 8, 2025 (10 pages).

*Primary Examiner* — Sean P Gramling

(74) *Attorney, Agent, or Firm* — Michael Best & Friedrich LLP

(57) ABSTRACT

A light assembly includes a base module including a housing and a cover coupled to the housing, the cover including a recess, the housing defining a cavity enclosed by the cover; a mast assembly extending between a first end and a second end, the first end coupled to the cover; and a lighting element coupled to the second end of the mast assembly. The mast assembly is adjustable between: an operating configuration, in which the mast assembly extends outwardly from the base module, and a storage configuration, in which the mast assembly is at least partially received within the recess of the cover.

15 Claims, 19 Drawing Sheets

(56) References Cited

U.S. PATENT DOCUMENTS

| | | | |
|---|---|---|---|
| 2015/0330558 | A1 | 11/2015 | Intravatola |
| 2024/0077181 | A1 | 3/2024 | Dee et al. |

FOREIGN PATENT DOCUMENTS

| | | | |
|---|---|---|---|
| CN | 211729113 | U | 10/2020 |
| CN | 214227921 | U | 9/2021 |
| CN | 216543233 | U | 5/2022 |
| CN | 219955104 | U | 11/2023 |

* cited by examiner

LIGHT ASSEMBLY FOR USE WITH A STORAGE SYSTEM

CROSS REFERENCE TO RELATED APPLICATIONS

This application claims priority to U.S. Provisional Patent Application No. 63/558,836, filed Feb. 28, 2024, the entire contents of which are incorporated by reference herein.

FIELD OF THE INVENTION

The present disclosure relates to transportation and storage of elevated lighting assemblies.

BACKGROUND OF THE INVENTION

Tool storage units are often used to transport tools and tool accessories. Some storage units are designed to incorporate into a modular storage system. Within a modular storage system, different units, devices and/or containers may provide varying functions, such as being adapted to provide light.

SUMMARY OF THE INVENTION

In some implementations, the disclosure provides a light assembly including: a base module including a housing and a cover coupled to the housing, the cover including a recess, the housing defining a cavity enclosed by the cover; a mast assembly extending between a first end and a second end, the first end coupled to the cover; and a lighting element coupled to the second end of the mast assembly. The mast assembly is adjustable between: an operating configuration, in which the mast assembly extends outwardly from the base module, and a storage configuration, in which the mast assembly is at least partially received within the recess of the cover.

In some implementations, the disclosure provides a light assembly including: a base module including a housing defining a cavity; a mast assembly extending between a first end and a second end, the first end coupled to the housing; and a lighting element coupled to the second end of the mast assembly. The mast assembly includes a plurality of bars, the mast assembly adjustable between: an operating configuration, in which the mast assembly extends outwardly from the base module, and a storage configuration, in which the plurality of bars wraps at least partially around a perimeter of the base module.

In some implementations, the disclosure provides a light assembly including: a base module including a housing defining a cavity and a drawer positioned on a first side of the housing; a mast assembly extending between a first end and a second end, the first end coupled to the drawer; and a lighting element coupled to the second end of the mast assembly. The mast assembly is adjustable between: an operating configuration, in which the mast assembly extends outwardly from the base module, and a storage configuration, in which the mast assembly is received within the drawer.

In some implementations, the disclosure provides a light assembly including: a base module including a housing defining a cavity and including a first side, a second side, a third side, and a fourth side having an aperture extending therethrough; a mast assembly extending between a first end and a second end, the first end coupled to the housing; and a lighting element coupled to the second end of the mast assembly. The mast assembly is adjustable between: an operating configuration, in which the mast assembly extends outwardly from the base module, and a storage configuration, in which the mast assembly is at least partially received within the cavity through the aperture and the lighting element is positioned adjacent the fourth side.

Other features and aspects of the disclosure will become apparent by consideration of the following detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

FIGS. 1A-10E illustrate various light assemblies for use with storage systems. For example, the light assemblies may be part of tool storage systems. In some embodiments, the storage system may be a modular storage system, such as Milwaukee Tool's PACKOUT modular storage system. The storage system may include toolboxes or cases, wall plates, shelves, hand trucks, dollies, and other suitable storage units. The storage units may interconnect with each other and be stackable. The light assemblies described below may be integrated with, mounted to, and/or stored within the storage units.

Figure 1A:
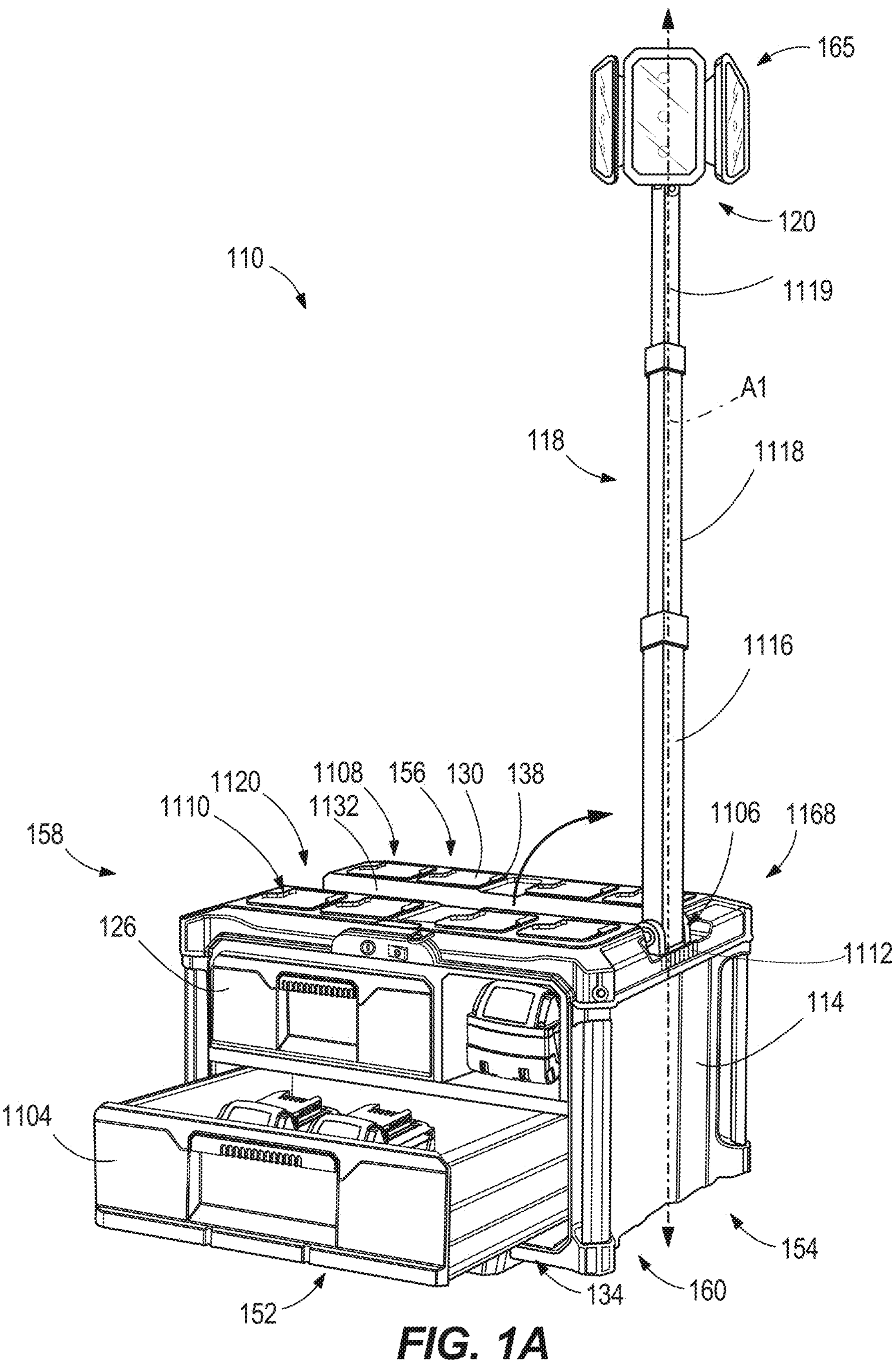
FIG. 1A is a perspective view of a light assembly according to a first embodiment, the light assembly in an operating position.
Figure 1B:
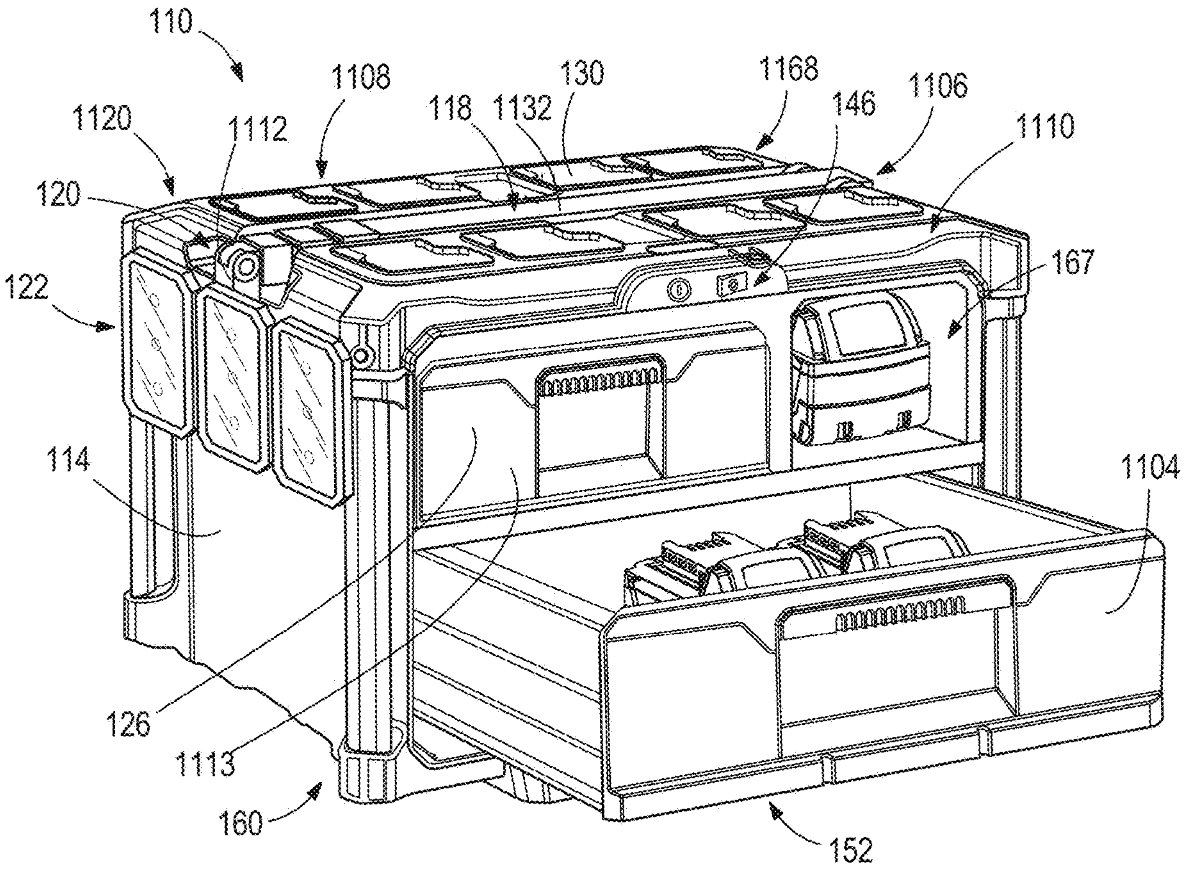
FIG. 1B is another perspective view of the light assembly of FIG. 1A, the light assembly in a storage configuration.

FIGS. 1A and 1B illustrate a light assembly 110. The light assembly 110 may also be referred to as a portable light assembly, an area light, a work light, a site light, or a stand light. The light assembly 110 may be used to illuminate a worksite or other type of area surrounding the light assembly 110. The illustrated light assembly 110 may be a stackable device including a base module 114 supported on a surface (e.g., the ground, a floor, a tabletop, etc.), a mast assembly 118 extending outwardly (e.g., upward) from the base module 114, and a lighting element 165 coupled to a distal end 120 of the mast assembly 118. The lighting element 165 includes one or more lighting elements, such as LEDs, light bulbs, or the like, to provide light or illumination to an area. The light assembly 110 is movable between a first, or operating, configuration and a second, or storage, configuration. The storage configuration may also be referred to as a closed configuration or transport configuration. The operating configuration may also be referred to as an extended configuration or working configuration. In the operating configuration, the mast assembly 118 extends from the base module 114, and the lighting element 165 provides illumination to an area.

The base module 114 may be a stackable case or storage unit and may include a housing 126 defining a cavity 134 and a cover 130. In some embodiments, the cover 130 is movably (e.g., pivotally, removably, etc.) coupled to the housing 126 for movement between a closed configuration, in which the cover 130 is coupled to the housing 126 and encloses the cavity 134, and an open configuration, in which the cavity 134 is accessible. The housing 126 defines a first side 152, a second side 154, a third side 156, a fourth side 158, a bottom side 160, and a top cover 130.

With continued reference to FIGS. 1A and 1B, the base module 114 includes a user interface 146. In the illustrated embodiment, the user interface 146 is positioned adjacent a first side 152 of the housing 126. In other embodiments, the user interface 146 may be positioned in other places, including inside the cavity 134, on the cover 130, or on the mast assembly 118 or lighting element 165. In some embodiments, the base module 114 may include a wireless transceiver to wirelessly communicate commands and data between the light assembly 110 and a remote device (e.g., a user's smartphone, tablet, laptop, computer, etc.). For example, the user interface 146 may also be integrated with a tool management system using Bluetooth® enabled tags, such as Milwaukee Tool's ONEKEY system. The user interface 146 includes various controls (e.g., buttons, switches, displays, indicators, etc.) to allow an operator to control operation of the light assembly 110 and the lighting element 165. In the illustrated embodiment, the illumination of the lighting element 165 may be controlled by the user interface 146. For example, the user interface 146 may include a power button or ON/OFF switch to selectively provide power to the lighting elements 165 in the lighting element 165. The user interface 146 may also include buttons or switches to adjust the intensity and/or mode of the light emitted from the lighting element 165 (e.g., low, medium, high, flashing, strobe, etc.). The user interface 146 may also include a battery gauge to display the amount of charge remaining in a connected battery.

The light assembly 110 may be coupled to another stackable device (not shown), such as a stackable storage unit, to create a modular storage system. The base module 114 may include a first set of coupling components positioned on a first or bottom surface of the housing 126. The first set of coupling components interface with corresponding coupling components on a top surface of the other stackable device to couple the device 110 to the other stackable device. The base module 114 may include a second set of coupling components 138 on a second or top surface of the cover 130 which interface with corresponding coupling components on a bottom surface of the other stackable device to couple the device 110 to the other stackable device. The first set of coupling components on the housing 126 have a complementary configuration to the coupling components 138 on the cover 130. For example, the first set of coupling components may be cleats, and the second set of coupling components 138 may be recesses that are sized and shaped to receive the cleats. In other embodiments, the first set of coupling components may be recesses and the second set of coupling components 138 may be cleats, or both the first and second sets of coupling components may include a mixture of cleats and recesses. In the present embodiment, the second set of coupling components 1120 comprises a first plurality of recesses 1108 and a second plurality of recesses 1110.

The cover 130 further includes a recess 1132 disposed between the first plurality of recesses 1108 and the second plurality of recesses 1110. The recess 1132 extends along a length of the cover 130. In the illustrated embodiment, the recess 1132 is substantially rectangular in shape. The recess 1132 is sized and shaped to receive and support the mast assembly 118 in the storage configuration. In some embodiments, the recess 1132 is shaped such that when the mast assembly 118 is in the storage configuration, the lighting element 165 lays generally flat on the fourth side 158 of the housing 126. In other embodiments, the lighting element 165 may lay generally flat on the cover 130. For example, the lighting element 165 may be configured to lay on top of the cover 130. Alternatively, the lighting element 165 may be generally coplanar with the fourth side 158 of the housing 126 or with the cover 130. That is, the lighting element 165 may be at least partially received in the housing 126 or the cover 130 such than an uppermost surface of the lighting element 165 is flush with (or does not extend beyond) an outer surface of the housing 126 or an upper surface of the cover 130. In other embodiments, the recess 1132 may have any suitable size and shape to receive and support the mast assembly 118.

In the embodiment of FIGS. 1A and 1B, the mast assembly 118 is telescoping and includes a first pole 1116, a second pole 1118, and a third pole 1119. In other embodiments, the mast assembly 118 may include fewer or more poles. The mast assembly 118 has a first or proximal end 1168 and the second or distal end 120. The proximal end 1168 of the mast assembly 118 is attached by a first hinge 1106 to the base 114 to attach the mast assembly 118 to the base 114. The first hinge 1106 may be rotatable, for example, 90 degrees between an upright position and a collapsed position. The first hinge 1106 is disposed on a side portion 1112 of the top cover 130 between the first plurality of recesses 1108 and the second plurality of recesses 1110. Similarly, the distal end 120 of the mast assembly 118 is coupled with the lighting element 165 by a second hinge 1107. The second hinge 1107 may be rotatable, for example, 90 degrees between a working position and a storage position.

The base module 114 also includes a first drawer 1104 and a second drawer 1113 disposed on the first side 152. The drawers 1104, 1113 are configured to provide storage for a user. In such an embodiment, the cover 130 may be non-movably coupled to the housing 126. In other embodiments, the base module 114 may include fewer or more drawers. In still other embodiments, the drawers 1104, 1113 may be omitted. In such embodiments, an interior of the base module 114 may be accessed by opening (e.g., pivoting, lifting, or sliding off) the cover 130 from the housing 126.

In the illustrated embodiment, the base module 114 includes a battery receptacle 167 adjacent the first drawer. The battery receptacle 167 is configured to receive a battery pack, such as a rechargeable power tool battery pack. When connected to the battery receptacle 167, the battery pack provides power to the lighting element 165.

To reach the working configuration, the mast assembly 118 is configured to telescope upward along a vertical, or upright, axis A1 such that the mast assembly 118 is in an extended position. The mast assembly 118 may extend approximately 7 feet or about 2.1 meters when in the extended position. To reach the storage configuration, the mast assembly 118 is collapsed such that the mast assembly 118 is in a collapsed position. Additionally, the hinge 1106 may be rotated −90 degrees such that the mast assembly 118 extends along the top cover 130 and is received in the recess 1132 between the first plurality of recesses 1108 and the second plurality of recesses 1110.

Figure 2A:
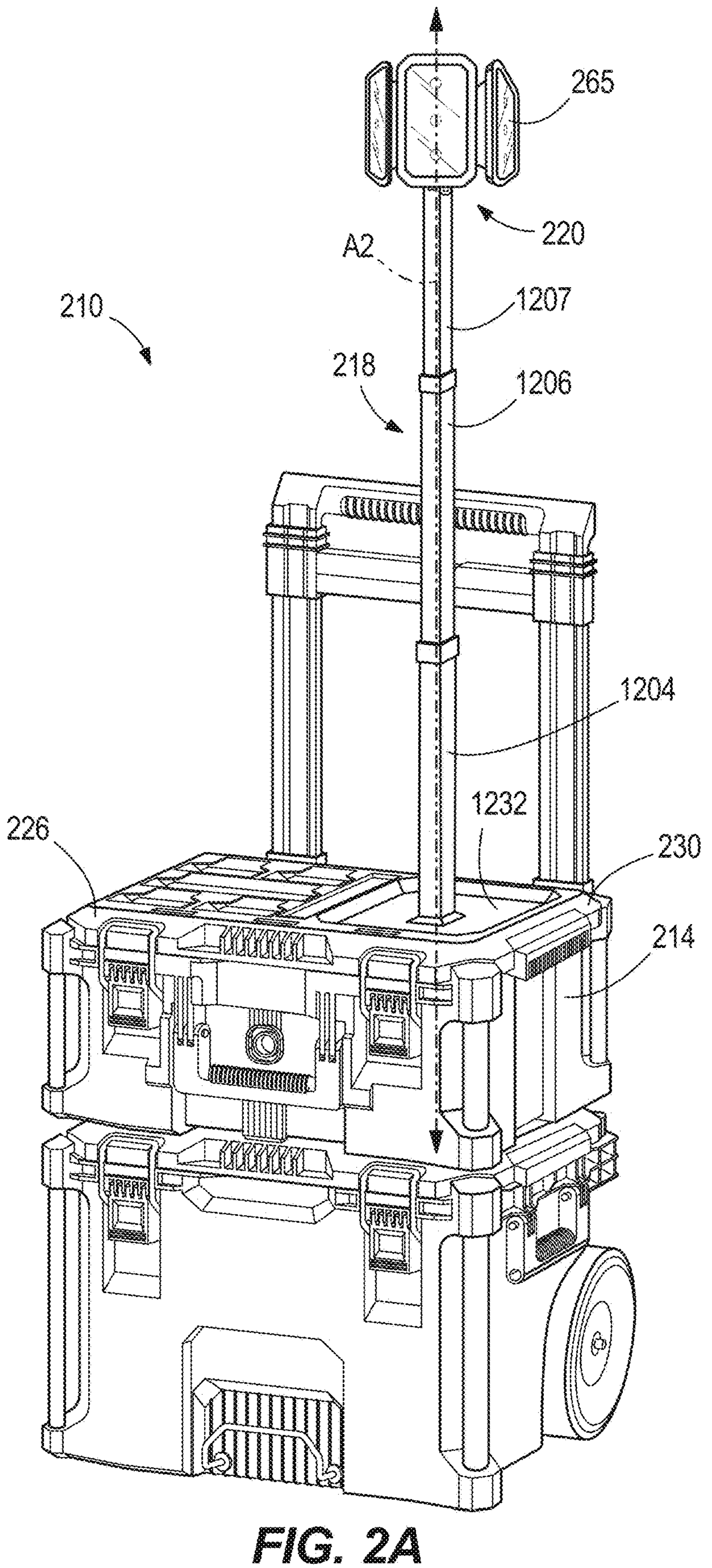
FIG. 2A is a perspective view of a light assembly according to a second embodiment, the light assembly in an operating configuration.
Figure 2B:
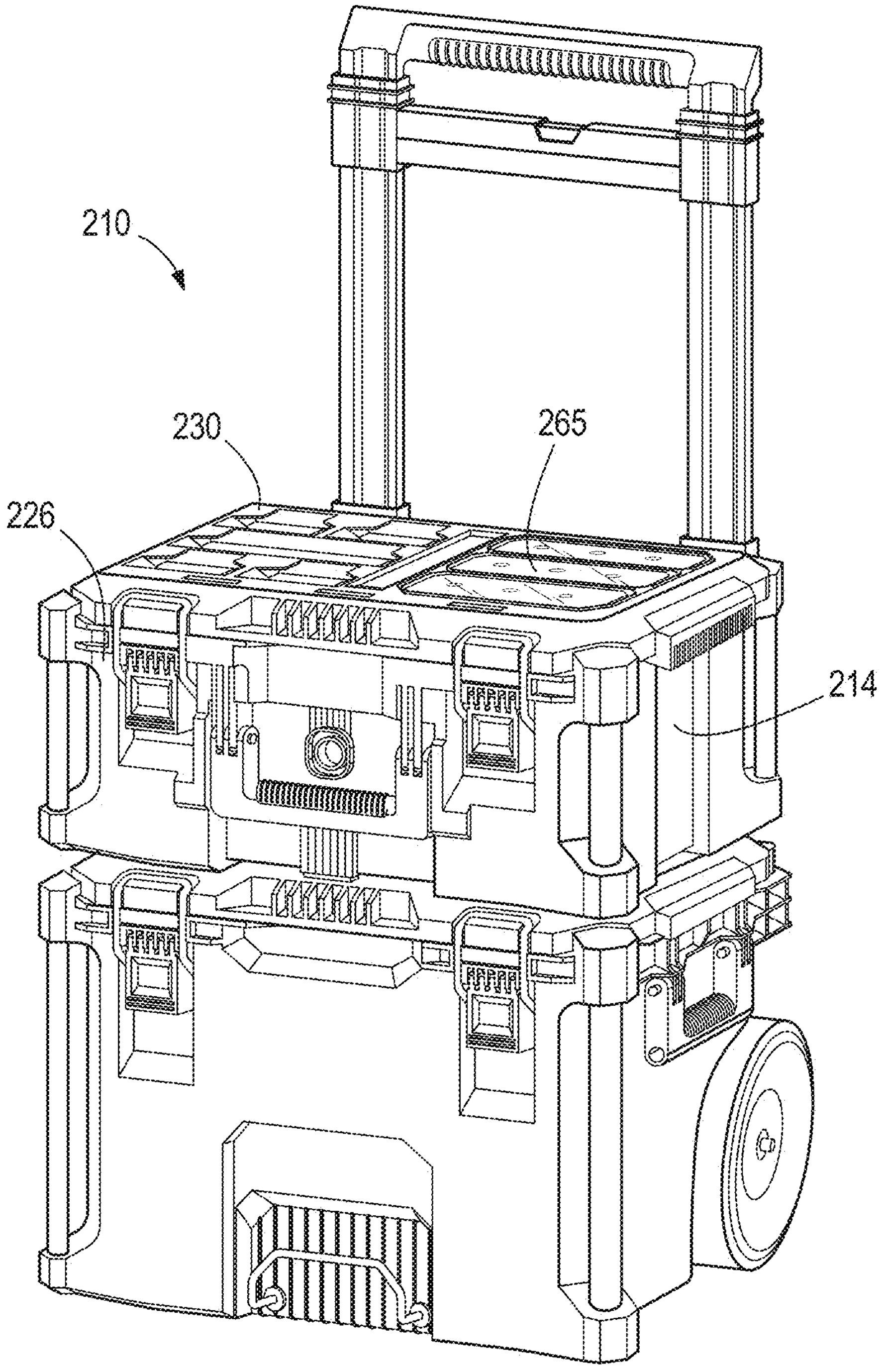
FIG. 2B is a perspective view of the light assembly of FIG. 2A, the light assembly in a storage configuration.

FIGS. 2A and 2B illustrate a light assembly 210 according to another embodiment of the disclosure. The light assembly 210 is like the light assembly 110 shown in FIG. 1A and described above. Therefore, like features are identified with like references numerals plus “100”, and only the differences between the two will be discussed.

The illustrated light assembly 210 includes a base module 214 supported on a surface, a mast assembly 218 extending upward from the base module 214 to a distal end 220, and a lighting element 265 coupled to the distal end 220 of the mast assembly 218. The lighting element 265 includes one or more lighting elements, such as LEDs, light bulbs, or the like, to provide light to an area. The light assembly 210 is movable between a first, or operating, configuration and a second, or storage, configuration. The storage configuration may also be referred to as a closed configuration or transport configuration. The operating configuration may also be referred to as an extended configuration or working configuration. In the operating configuration, the mast assembly 218 extends from the base module 214, and the lighting element 265 provides illumination to an area.

In the embodiment of FIGS. 2A and 2B, the mast assembly 218 is housed within the base module 214. The mast assembly 218 is telescoping and includes a first pole 1204, a second pole 1206, and a third pole 1207 which are configured to extend along an upright, or vertical, axis A2. In other embodiments, the mast assembly 218 may include fewer or more poles. A first or proximal end of the mast assembly 218 is coupled to a top cover 230 of the base 214. The second or distal end 220 of the mast assembly 218 is coupled with the lighting element 265. The cover 230 includes a recess 1232 positioned coaxial with the upright axis A2. The recess 1232 is substantially rectangular in shape. The recess 1232 is sized and shaped to receive lighting element 265 in the storage configuration. Accordingly, the recess 1232 is shaped such that when the mast assembly 218 is in the storage configuration, the lighting element 265 is generally coplanar with the cover 230. In other embodiments, the recess 1232 may have any suitable size and shape to receive and support the mast assembly 218.

To reach the operating configuration (FIG. 2A), the mast assembly 218 may be extended along axis A2 until the mast assembly 218 is outside of the base module 214. The mast assembly 218 is configured to telescope upward along the axis A2 such that the mast assembly 218 is in an extended position. The mast assembly 218 extends approximately 7 feet or about 2.1 meters when in the extended position.

To return the mast assembly 218 to the storage configuration (FIG. 2B), the mast assembly 218 is collapsed such that the mast assembly 218 is received in and surrounded by a housing 226 of the base module 214. While in the storage configuration, the lighting element 265 extends along a top cover 230 of the base module 214 and may be oriented outward and away from the base 214 as shown in FIG. 2*b*. The lighting element 265 is also generally flush or coplanar with the top cover 230. This orientation allows for the lighting element 265 to be illuminated for use when in the storage position. Alternatively, the lighting element 265 may be oriented toward the base module 214 to protect the lighting element 265 when the mast assembly 218 is in the storage configuration.

Figure 3A:
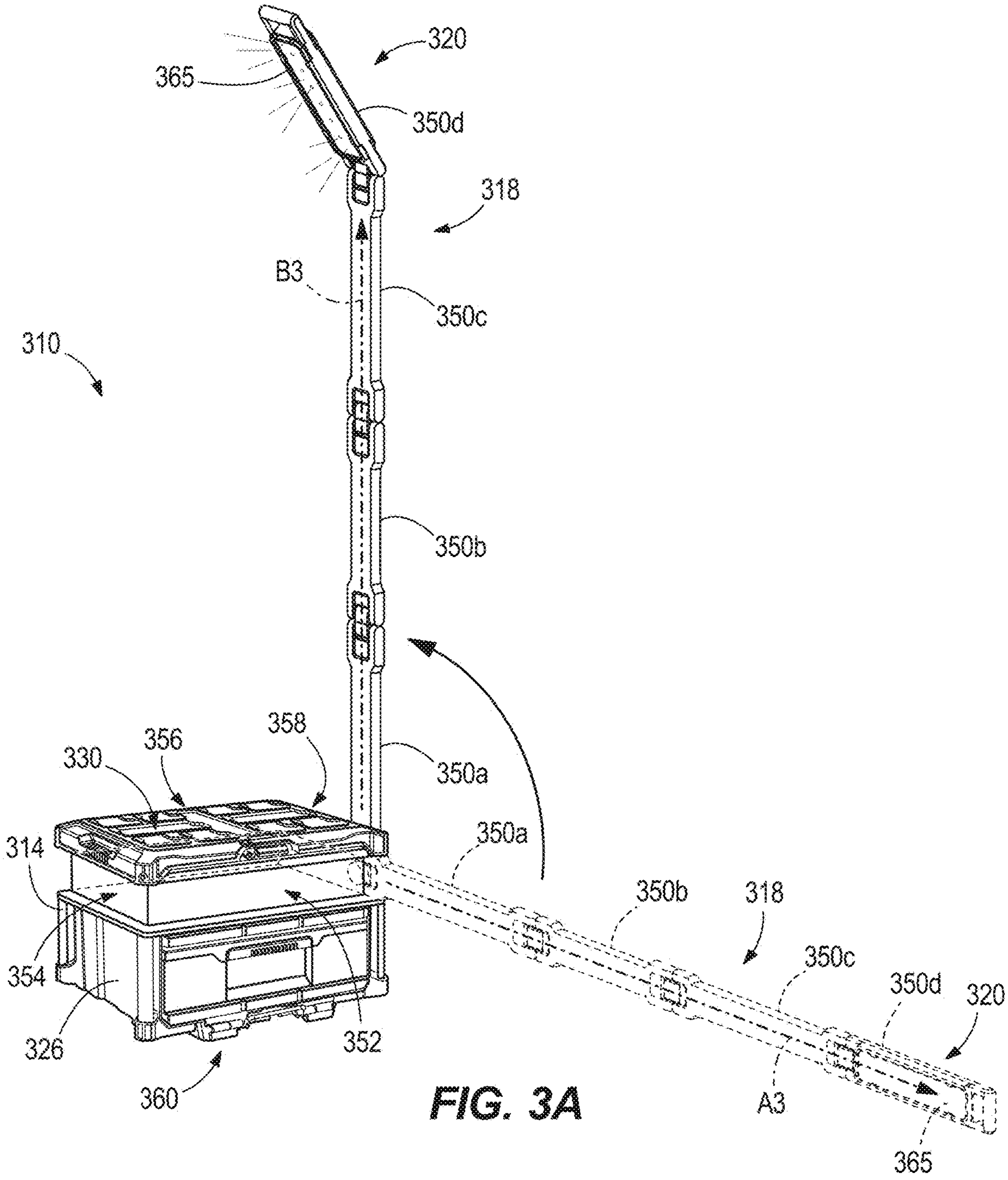
FIG. 3A is a perspective view of a light assembly according to a third embodiment, the light assembly in an operating configuration.
Figure 3B:
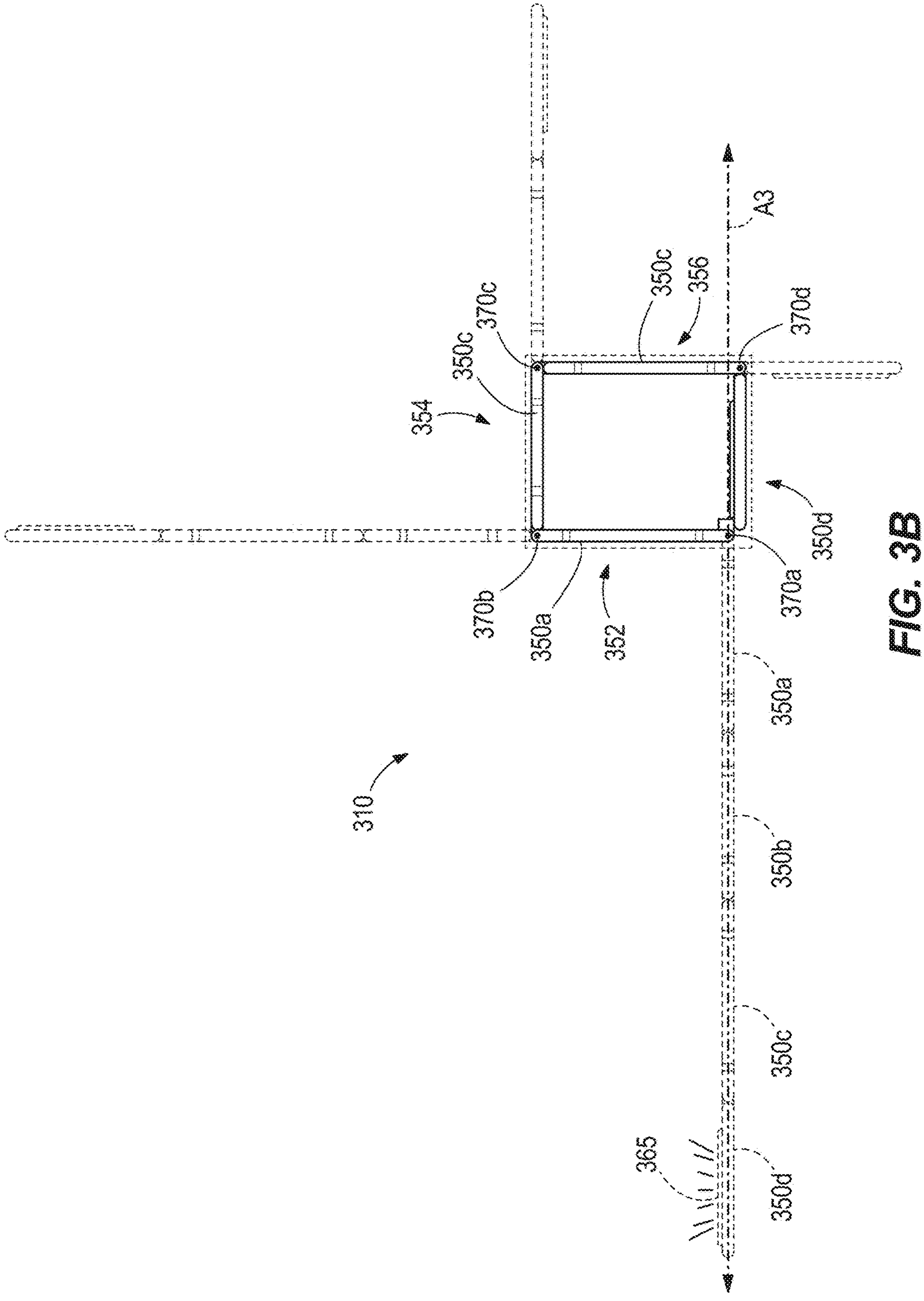
FIG. 3B is a plan view of the light assembly of FIG. 3A, the light assembly in a storage configuration.

FIGS. 3A and 3B illustrate a light assembly 310 according to another embodiment of the disclosure. The light assembly 310 is like the light assembly 110 shown in FIG. 1A and described above. Therefore, like features are identified with like references numerals plus “200”, and only the differences between the two will be discussed.

The illustrated light assembly 310 includes a base module 314, a mast assembly 318 extending upward from the base module 314 to a distal end 320, a cover 330, and a lighting element 365 coupled to the distal end 320 of the mast assembly 318. The lighting element 365 includes one or more lighting elements, such as LEDs, light bulbs, or the like, to provide light to an area. The light assembly 310 is movable between a first, or operating, configuration and a second, or storage, configuration. The storage configuration may also be referred to as a closed configuration or transport configuration. The operating configuration may also be referred to as an extended configuration or working configuration. In the operating configuration, the mast assembly 318 extends from the base module 314, and the lighting element 365 provides illumination to an area.

The illustrated mast assembly 318 includes a plurality of bars. In the illustrated embodiment, the mast assembly 318 includes four bars: a first bar 350*a*, a second bar 350*b*, a third bar 350*c*, and a fourth bar 350*d*. In other embodiments, the mast assembly 318 may include fewer or more bars. Each bar 350*a-d* includes a distal end and a proximal end. The first or proximal end of the first bar 350*a* is coupled via a first hinge 370*a* to the housing 326. The second or distal end of the first bar 350*a* is coupled via a second hinge 370*b* to the proximal end of the second bar 350*b*. The distal end of the second bar 350*b* is coupled via a third hinge 370*c* to the proximal end of the third bar 350*c*. The distal end of the third bar 350*c* is coupled via a fourth hinge 370*d* to the proximal end of the fourth bar 350*d*. As such, the bars 350*a*, 350*b*, 350*c*, 350*d* are pivotally coupled to each other. The second or distal end of the fourth bar 350*d* is coupled with the lighting element 365. The lighting element 365 may be pivotally coupled to the fourth bar 350*d* or immovably coupled to the fourth bar 350*d*. The first bar 350*a* may be rotatable, for example, 270 degrees about the first hinge 370*a* and is bounded by the housing 326. The second bar 350*b*, the third bar 350*c*, and the fourth bar 350*d* may each be rotatable, for example, 360 degrees.

To reach a first operating configuration, the first bar 350*a* is rotated 90 degrees relative to the fourth side 352, the second bar 350*b* is rotated 90 degrees relative to the first bar 350*a*, the third bar 350*c* is rotated 90 degrees relative to the second bar 350*b*, and the fourth bar 350*d* is rotated 90 degrees relative to the third bar 350*c* such that each bar 350*a-d* aligns and extends straight along the axis A3 defined by the fourth side 358. To reach a second working configuration, the first bar 350*a* is rotated an additional 90 degrees relative to the axis A3 such that each of the first bar 350*a*, the second bar 350*b*, the third bar 350*c*, and the fourth bar 350*d* extends straight up along a vertical axis B3. Each hinge 370*a-d* is configured to lock (e.g., snap) when the longitudinal axes of the bars 350*a-d* align. For example, when the bars 350*a-d* extend straight (i.e., when in the working configuration) each hinge 370*a-d* locks to inhibit the bars 350*a-d* from freely rotating.

In the storage configuration, the first bar 350*a* extends along or adjacent the first side 352, the second bar 350*b* extends along or adjacent the second side 354, the third bar 350*c* extends along or adjacent the third side 356, and the fourth bar 350*d* extends along or adjacent the fourth side 358. In other words, when in the storage configuration, the bars 350*a-d* wrap around the outside or perimeter of the base module 314. The light assembly 310 may be usable in both the operating configuration and the storage configuration. Alternately, in the storage configuration, the lighting element 365 may be oriented toward the base 314 to protect the lighting element 365 when in the storage configuration. In the present embodiment, the bars 350*a-d* are sturdy aluminum bars. However, in other embodiments, the bars 350*a-d* may be any of a plurality of different materials (e.g., metal, plastic, glass, etc.).

Figure 4:
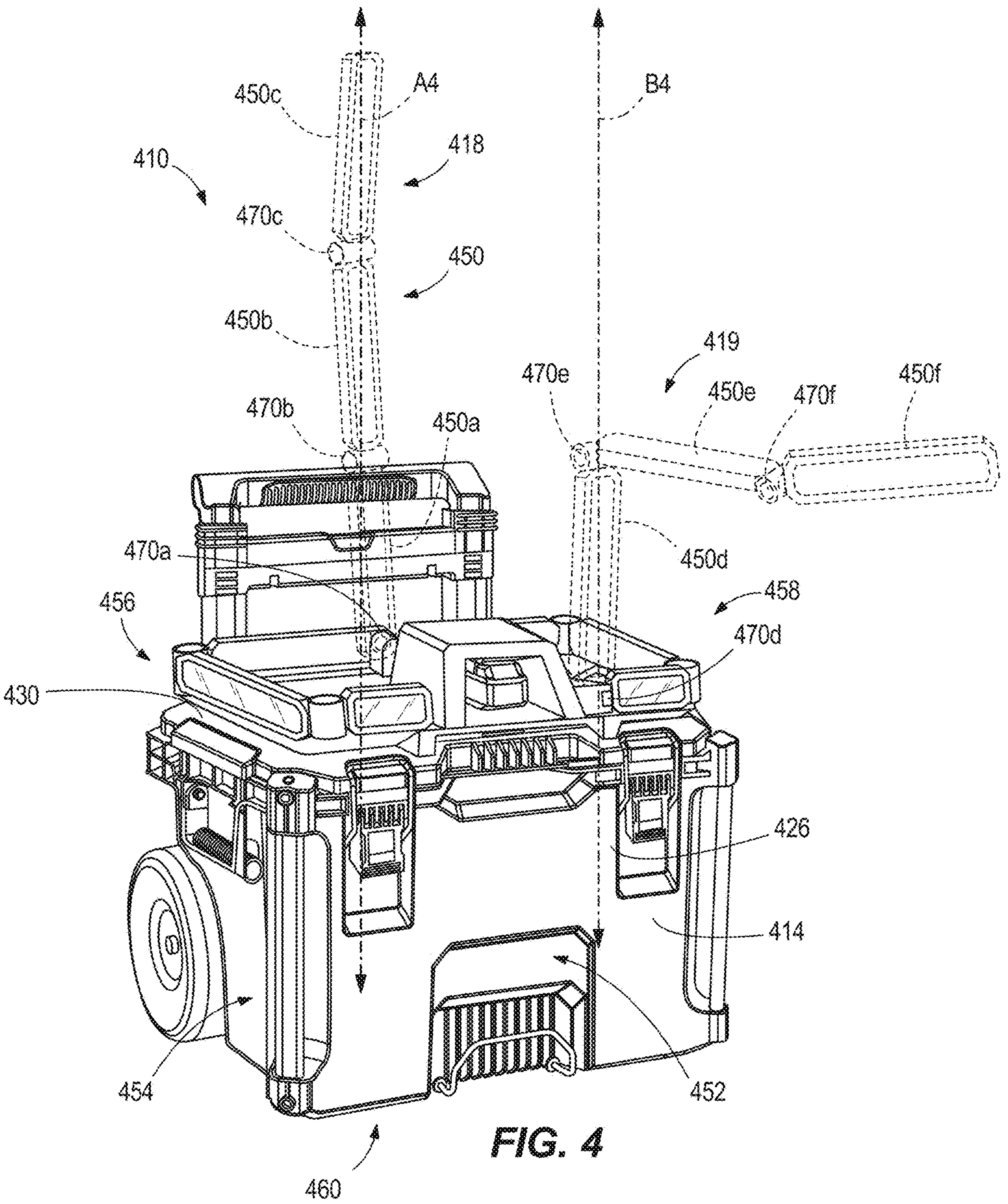
FIG. 4 is a perspective view of a light assembly according to a fourth embodiment.

FIG. 4 illustrates a light assembly 410 according to another embodiment of the disclosure. The light assembly 410 is like the light assembly 110 shown in FIG. 1A and described above. Therefore, like features are identified with like references numerals plus "300", and only the differences between the two will be discussed.

The illustrated light assembly 410 includes a base module 414 supported on a surface, a first mast assembly 418 extending upward from the base module 414, and a second mast assembly 419 extending upward from the base module 414. The first mast assembly 418 and the second mast assembly 419 each include a plurality of lighting bars 450, including LEDs, light bulbs, or the like, to provide light to an area. The light assembly 410 is movable between a first, or operating, configuration and a second, or storage, configuration. The storage configuration may also be referred to as a closed configuration or transport configuration. The operating configuration may also be referred to as an extended configuration or working configuration. In the operating configuration, the mast assemblies 418, 419 extend from the base module 414, and the lighting bars 450 provide illumination to an area.

The base module 414 may be a storage unit and includes a housing 426 defining a first side 452, a second side 454, a third side 456, a fourth side 458, a bottom side 460, and a top cover 430. The base module 414 may be coupled to (e.g., stackable with) another storage unit.

The first mast assembly 418 includes three lighting bars: a first bar 450*a*, a second bar 450*b*, and a third bar 450*c*. The second mast assembly 419 includes three lighting bars: a fourth bar 450*d*, a fifth bar 450*e*, and a sixth bar 450*f*. In other embodiments, the first mast assembly 418 and the second mast assembly 419 may include fewer or more bars. Each bar 450*a-f* includes a first or distal end and a second or proximal end. The proximal end of the first bar 450*a* is coupled via a first hinge 470*a* to a back side of the top cover 430. The distal end of the first bar 450*a* is coupled via a second hinge 470*b* to the proximal end of the second bar 450*b*. The distal end of the second bar 450*b* is coupled via a third hinge 470*c* to the proximal end of the third bar 450*c*. As such, the bars 450*a-c* are pivotally and rotatably coupled to each other. The proximal end of the fourth bar 450*d* is coupled via a fourth hinge 470*d* to a front side of the top cover 430. The distal end of the fourth bar 450*d* is coupled via a fifth hinge 470*e* to the proximal end of the fifth bar 450*e*. The distal end of the fifth bar 450*e* is coupled via a sixth hinge 470*f* to the proximal end of the sixth bar 450*f*. As such, the bars 450*d-f* are pivotally and rotatably coupled to each other.

To reach the operating configuration, the first bar 450*a* is rotated 90 degrees relative to the top cover 430, the second bar 450*b* is rotated 90 degrees relative to the first bar 450*a*, and the third bar 450*c* is rotated 90 degrees relative to the second bar 450*b*, such that each bar 450*a-c* aligns and extends straight along the axis A4 defined by the fourth side 158. Additionally, the fourth bar 450*d* is rotated 90 degrees relative to the top cover 430, the fifth bar 450*e* is rotated 90 degrees relative to the fourth bar 450*d*, and the sixth bar 450*f* is rotated 90 degrees relative to the fifth bar 450*e*, such that each bar 450*d-f* aligns and extends straight along the axis B4 defined by the first side 452. The hinges 470*a-f* may be, for example, ball and socket joints that allow the hinges 470*a-f* to both pivot and rotate. The hinges 470*a-f* may also be friction hinges that maintain their positions until acted on by a user. As such, the light bars 450*a*-450*f* may extend in different directions and at different angles relative to each other so that the mast assemblies 418, 419 may achieve different shapes or configurations. In other embodiments, each hinge 470*a-f* may be configured to lock (i.e., snap) when the longitudinal axes of the bars 450*a-f* align. For example, when the bars 450*a-f* extend straight (i.e., when in the working configuration) each hinge 470*a-f* locks to prevent the bars 450*a-f* from freely rotating.

In the storage configuration, the first bar 450*a* extends along the third side 456, the second bar 450*b* extends along the second side 454, the third bar 450*c* extends along the first side 452, the fourth bar 450*d* extends along the first side 452, the fifth bar 450*e* extends along the fourth side 458, and the sixth bar 450*f* extends along the third side 456. In other words, when in the storage configuration, the bars 450*a-f* wrap around the outside of the base module 414. The light assembly 410 may be usable in both the operating configuration and the storage configuration. Alternately, in the storage configuration, the lighting bars 450 may be oriented toward the base module 414 to protect the lighting bars 450 when in the storage configuration.

Figure 5A:
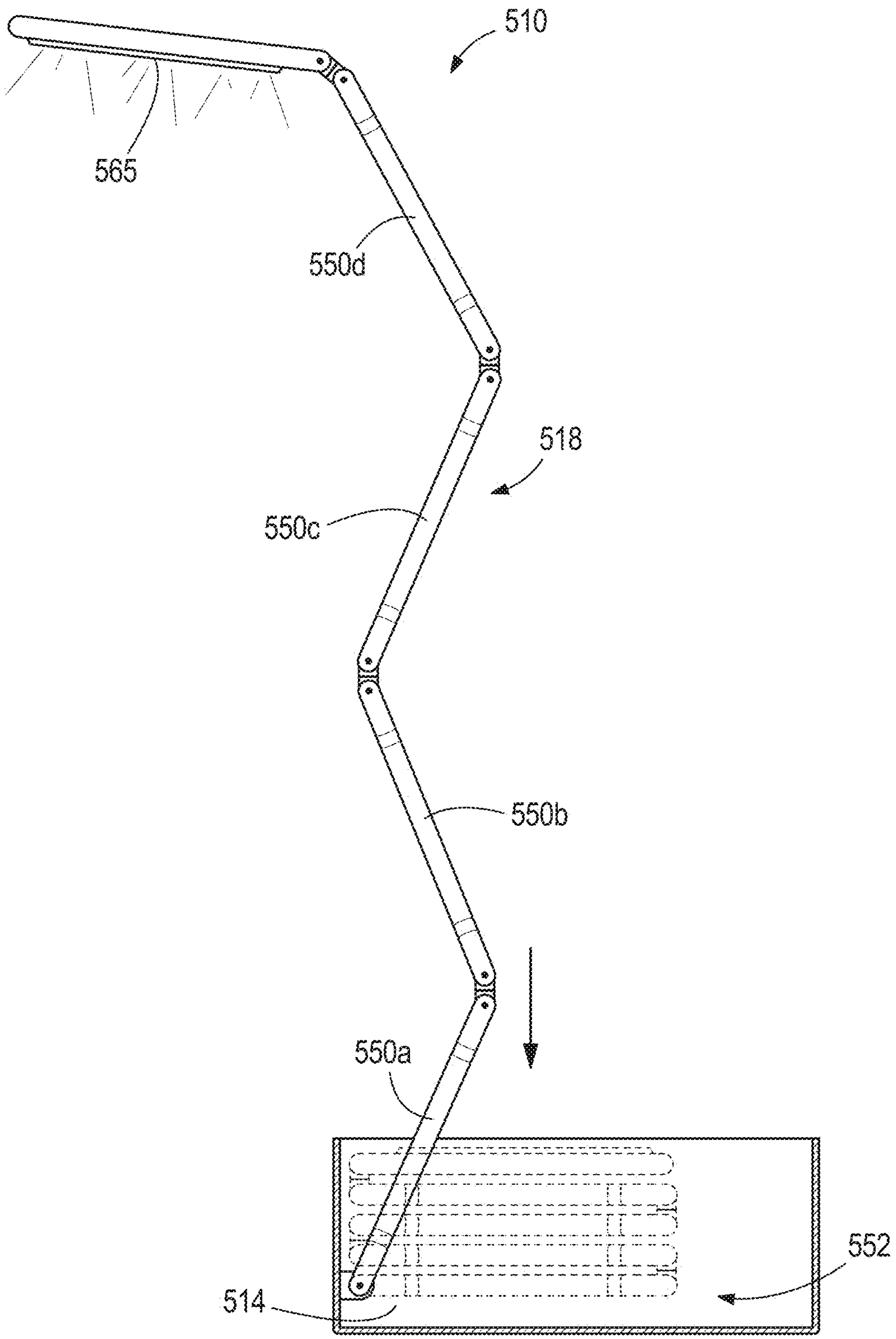
FIG. 5A is a plan view of a light assembly according to a fifth embodiment, the light assembly in a storage configuration.
Figure 5B:
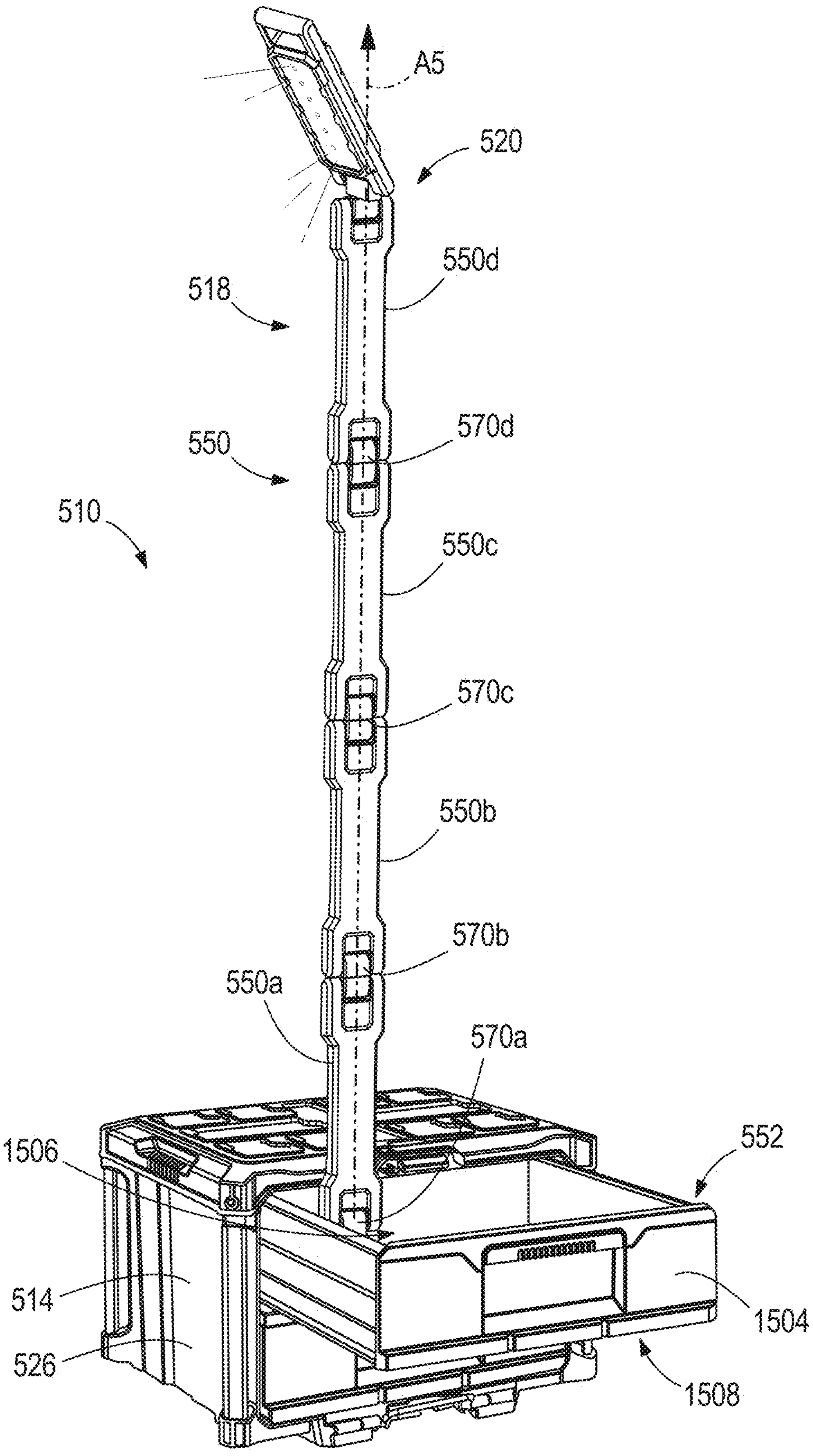
FIG. 5B is a perspective view of the light assembly of FIG. 5A, the light assembly in an operating configuration.

FIGS. 5A and 5B illustrate a light assembly 510 according to another embodiment of the disclosure. The light assembly 510 is like the light assembly 110 shown in FIG. 1A and described above. Therefore, like features are identified with like references numerals plus "400", and only the differences between the two will be discussed.

The illustrated light assembly 510 includes a base module 514 supported on a surface, a mast assembly 518 extending upward from the base module 514, and a lighting element 565 coupled to a distal end 520 of the mast assembly 518. The lighting element 565 includes one or more lighting elements, such as LEDs, light bulbs, or the like, to provide light to an area. The light assembly 510 is movable between a first, or operating, configuration and a second, or storage, configuration. The storage configuration may also be referred to as a closed configuration or transport configuration. The operating configuration may also be referred to as an extended configuration or working configuration. In the operating configuration, the mast assembly 518 extends from the base module 514, and the lighting element 565 provides illumination to an area.

The illustrated mast assembly 518 includes a plurality of bars 550. In the illustrated embodiment, the mast assembly 518 includes four bars: a first bar 550*a*, a second bar 550*b*, a third bar 550*c*, and a fourth bar 550*d*. In other embodiments, the mast 518 may include fewer or more bars. Each bar 550*a-d* includes a first or distal end and a second or proximal end. The proximal end of the first bar 550*a* is coupled via a first hinge 570*a* to the housing 526. The distal end of the first bar 550*a* is coupled via a second hinge 570*b* to the proximal end of the second bar 550*b*. The distal end of the second bar 550*b* is coupled via a third hinge 570*c* to the proximal end of the third bar 550*c*. The distal end of the third bar 550*c* is coupled via a fourth hinge 570*d* to the proximal end of the fourth bar 550*d*. As such, the bars 550*a*, 550*b*, 550*c*, 550*d* are pivotally coupled to each other. The distal end of the fourth bar 550*d* is coupled with the lighting element 565.

The illustrated base module 514 includes a drawer 1504 on the first side 552. The drawer 1504 is configured to house the mast assembly 518 in the storage configuration. The first hinge 570*a* is connected to an inner side 1506 of the drawer 1504. The first bar 550*a* is configured to rotate 90 degrees and is bounded by a bottom 1508 of the drawer 1504 and the inner side 1506 of the drawer 1504. The second bar 550*b*, the third bar 550*c*, and the fourth bar 550*d* are each configured to be folded in an accordion style to be stored within the drawer 1504. Accordingly, the second bar 550*b* is rotatable −90 degrees relative to the first bar 550*a*, the third bar 550*c* is rotatable 90 degrees relative to the second bar 550*b*, and the fourth bar 550*d* is rotatable −90 degrees relative to the third bar 550*c*.

To reach the operating configuration, the first bar 550*a* is rotated about the first hinge 570*a* −90 degrees such that the first bar 550*a* extends along the inner side 1506 of the drawer 1504. The second bar 550*b*, the third bar 550*c*, and the fourth bar 550*d* each extend straight up along the axis A5 defined by the inner side 1506 of the drawer 1504. Each hinge 570*a-d* is configured to lock at 0 degrees, or when the bars 150*a-d* extend straight (i.e., when in the operating configuration) each hinge 570*a-d* locks to inhibit the bars 550*a-d* from freely rotating.

To reach the storage configuration from the operating configuration, the first bar 550*a* is rotated about the first hinge 570*a* such that the first bar 550*a* extends along the bottom 1508 of the drawer 1504. The second bar 550*b* is rotated −90 degrees about the second hinge 570*b* such that the second bar 550*b* extends along the first bar 550*a*. The third bar 550*c* is rotated 90 degrees about the third hinge 570*c* such that the third bar 550*c* extends along the second bar 550*b*. Lastly, the fourth bar 550*d* is rotated −90 degrees about the fourth hinge 570*d* such that the fourth bar 550*d* extends along the third bar 550*c*. In other words, when in the storage configuration, the bars 550*a-d* collapse in an accordion style such that the bars 550*a-d* fit in the drawer 1504 and allow the drawer 1504 to be closed.

Figure 6:
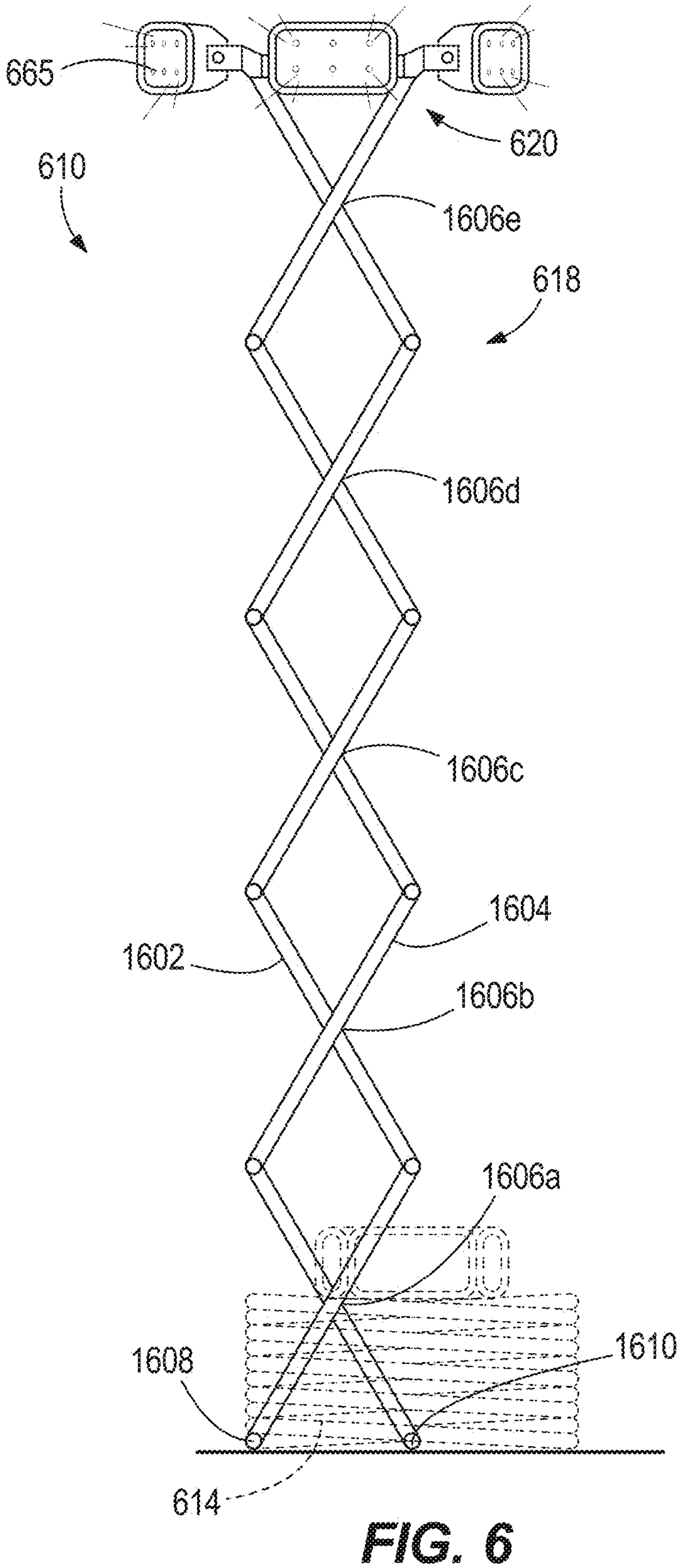
FIG. 6 is a plan view of a light assembly according to a sixth embodiment.

FIG. 6 illustrates a light assembly 610 according to another embodiment of the disclosure. The light assembly 610 is like the light assembly 110 shown in FIG. 1A and described above. Therefore, like features are identified with like references numerals plus "500", and only the differences between the two will be discussed.

The illustrated light assembly 610 includes a base module 614 supported on a surface, a mast assembly 618 extending upward from the base module 614, and a lighting element 665 coupled to a distal end 620 of the mast assembly 618. The lighting element 665 includes one or more lighting elements 665, such as LEDs, light bulbs, or the like, to provide light to an area. The light assembly 610 is movable between a first, or operating, configuration and a second, or storage, configuration. The storage configuration may also be referred to as a closed configuration or transport configuration. The operating configuration may also be referred to as an extended configuration or working configuration. In the operating configuration, the mast assembly 618 extends from the base module 614, and the lighting element 665 provides illumination to an area.

The illustrated mast assembly 618 includes a first set of links 1602 and a second set of links 1604. The lighting element 665 is coupled to the distal end 620 of the mast assembly 618. The first set of links 1602 and the second set of links 1604 each include five total links. The first set of links 1602 and the second set of links 1604 are connected at a first joint 1606*a*, a second joint 1606*b*, a third joint 1606*c*, a fourth joint 1606*d*, and a fifth joint 1606*e*. Therefore, and as shown in FIG. 6, the first set of links 1602 and the second set of links 1604 create a plurality of connected parallelograms configured to operate as a scissor lift. In other embodiments, the mast assembly 618 may include a third set of links and a fourth set of links to allow for scissoring in two axes to improve stability. The first set of links 1602 includes a first bottom connection hinge 1608 configured to fix the first set of links 1602 to the base module 614. The second set of links 1604 includes a second bottom connection hinge 1610 configured to attach the second set of links 1604 to the base module 614. The second bottom connection hinge 1610 may be configured to slide within a slot provided in the base 614, thereby allowing the second bottom connection hinge 1610 to slide toward and away from the first bottom connection hinge 1608. The base 614 further includes a lifter mechanism configured to actuate the movement of the second bottom connection hinge 1610.

To reach the operating configuration, the lifter mechanism actuates the second bottom connection hinge 1610 to slide toward the first bottom connection hinge 1608, causing the first set of links 1602 and the second set of links 1604 to be extended. Alternatively, a user may pull up on the links 1602, 1604 or the lighting element 665 to raise the mast assembly 618. In some embodiments, the mast assembly 618 may be configured to reach a height of 7 feet or about 2.1 meters. In alternate embodiments, the mast assembly 618 may reach any of a plurality of different heights.

To reach the storage configuration, the lifter mechanism actuates the second bottom connection hinge 1610 to slide away from the first bottom connection hinge 1608, causing the first set of links 1602 and the second set of links 1604 to be collapsed. Alternatively, a user may pull down on the links 1602, 1604 or the lighting element 665 to lower the mast assembly 618. In this configuration, the mast assembly 618 is collapsible to a height of less than 1 foot or about 0.3 meters. In alternate embodiments, the mast assembly 618 may be collapsed to any of a plurality of different heights.

Figure 7A:
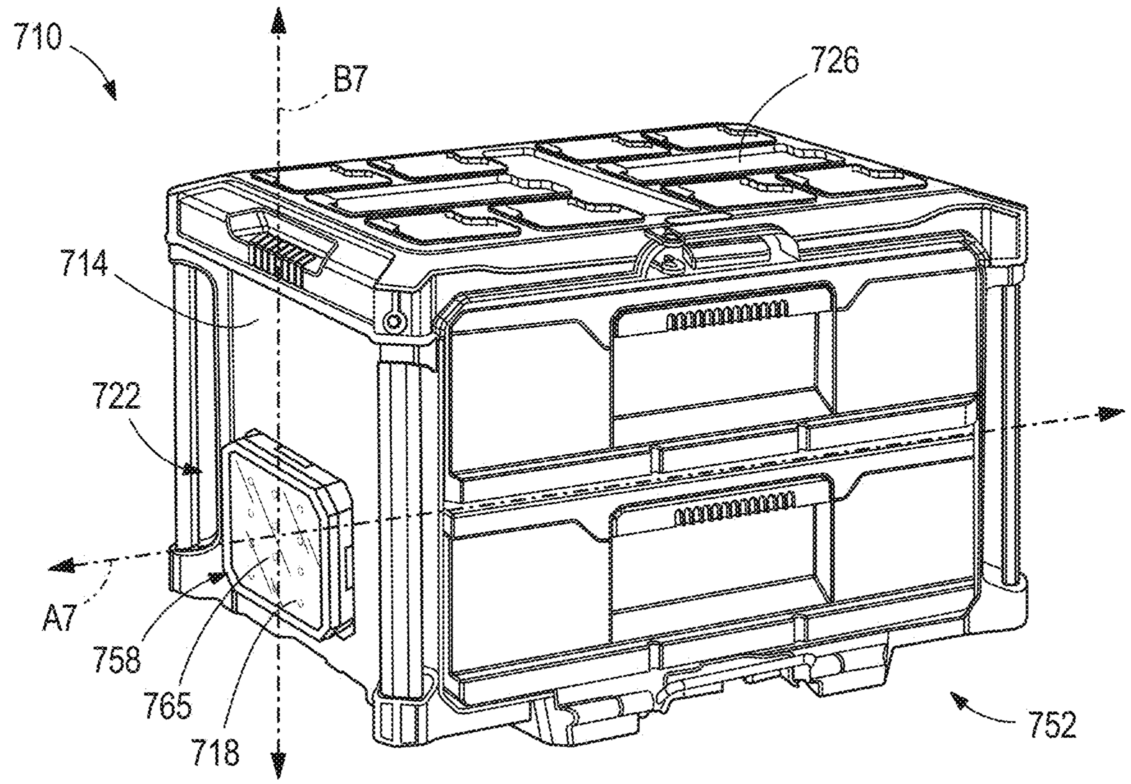
FIG. 7A is a perspective view of a light assembly according to a seventh embodiment, the light assembly in a storage configuration.
Figure 7B:
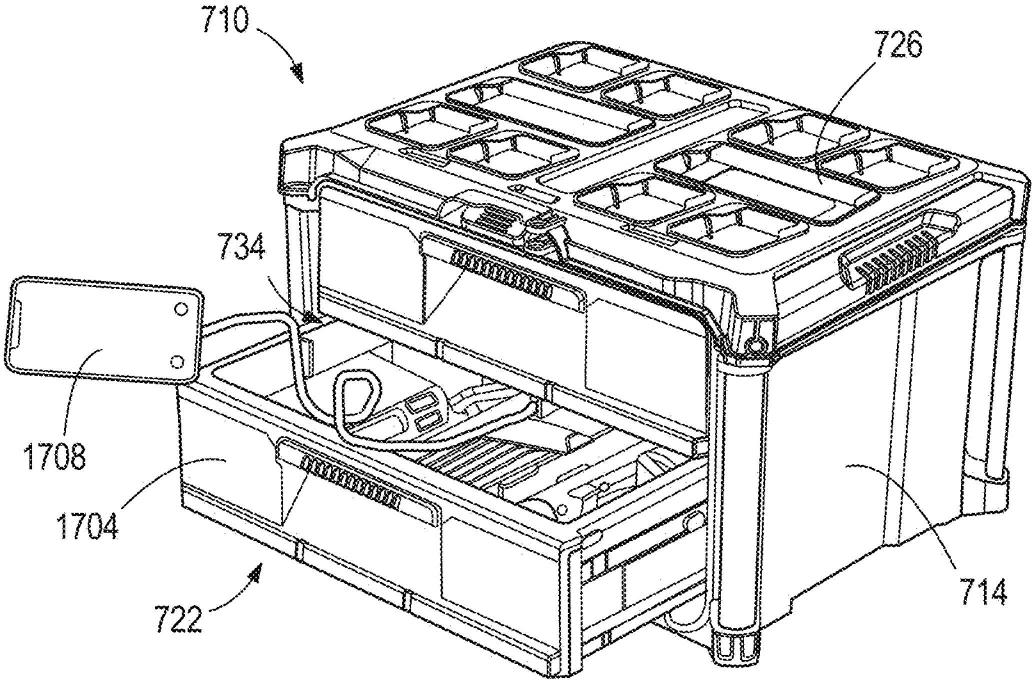
FIG. 7B is a second perspective view of the light assembly of FIG. 7A.
Figure 7C:
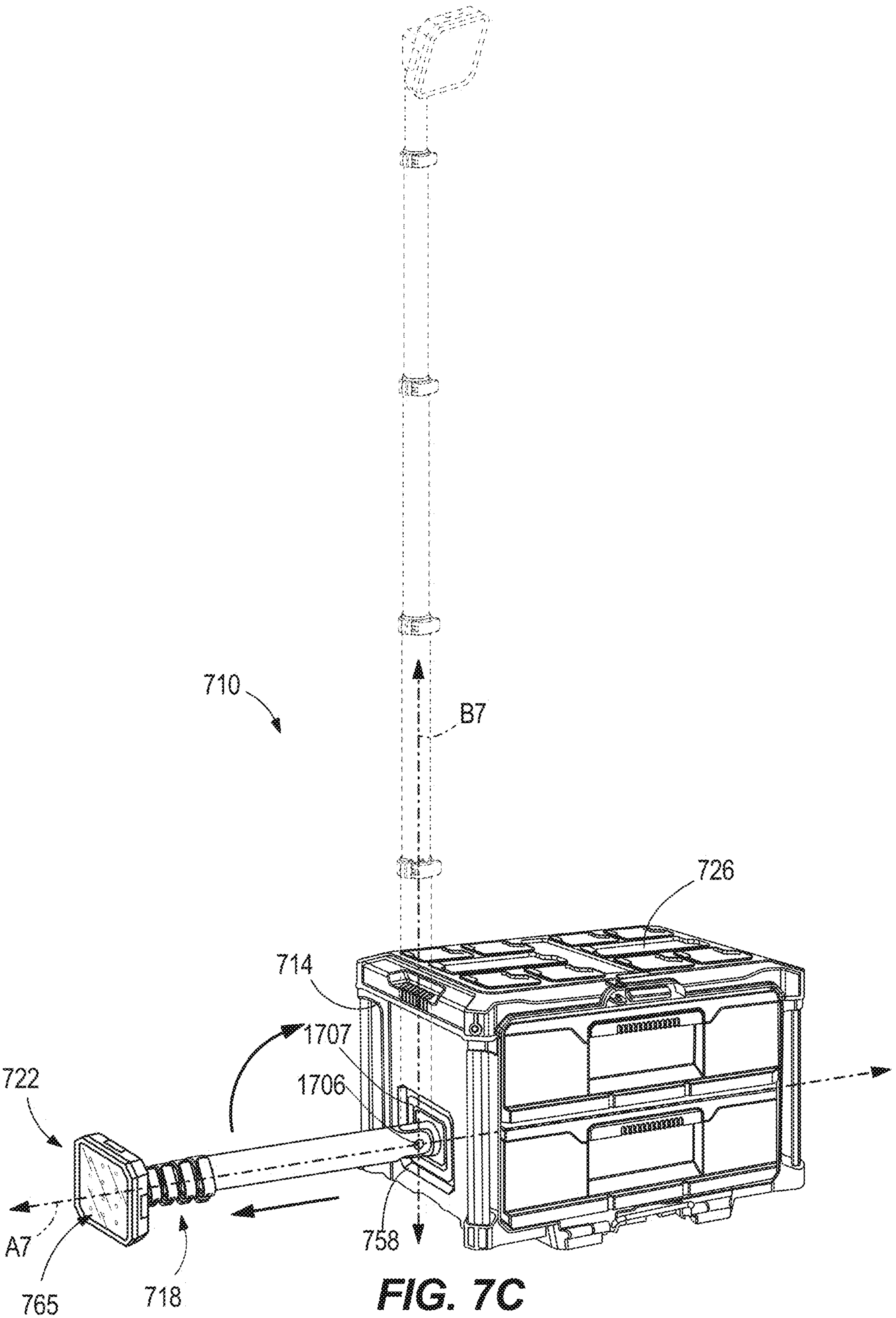
FIG. 7C is a third perspective view of the light assembly of FIG. 7A, the light assembly in an operating configuration.

FIGS. 7A-7C illustrate a light assembly 710 according to another embodiment of the disclosure. The light assembly 710 is like the light assembly 110 shown in FIG. 1A and described above. Therefore, like features are identified with like references numerals plus "600", and only the differences between the two will be discussed.

The illustrated light assembly 710 includes a base module 714 supported on a surface, a mast assembly 718, and a lighting element 765 coupled to the distal end of the mast assembly. The base module 714 may include a housing 726 defining a cavity 734 configured to receive the mast assembly 718 therein. The lighting element 765 includes one or more lighting elements, such as LEDs, light bulbs, or the like, to provide light to an area. The light assembly 710 is movable between a first, or operating, configuration and a second, or storage, configuration. The storage configuration may also be referred to as a closed configuration or transport configuration. The operating configuration may also be referred to as an extended configuration or working configuration. In the operating configuration, the mast assembly extends from the base module 714 through a fourth side 758 of the base module 714, and the lighting element 765 provides illumination to an area.

In the embodiment of FIGS. 7A-7C, the mast assembly 718 is housed within the base module 714. Similar to the mast assembly 118 of FIG. 1*a*, the mast assembly 718 may include a plurality telescoping poles. A proximal end of the mast assembly 718 may be attached to the base module 714 by a hinge 1706.

To reach the operating configuration, the mast assembly 718 may be extended through an aperture 1707 on the fourth side 758 of the base module 714 and along axis A7 until the mast assembly 718 is outside of the base module 714. The mast assembly 718 may then be rotated (e.g., 90 degrees), allowing the mast assembly 718 to extend upward along the fourth side 758 of the base module 714. The hinge 1706 attaching the mast assembly 718 to the base module 714 may be configured to lock at 90 degrees, or when the mast assembly 718 extends straight upward along axis B7 (i.e., when in the working configuration) to inhibit the mast assembly 718 from freely rotating. When outside of the base module 714, the mast assembly 718 may be configured to telescope upward along the axis B7 such that the mast assembly 718 is in an extended position. The mast assembly 718 may extend approximately 7 feet or about 2.1 meters when in the extended position.

To return the mast assembly 718 to the storage configuration, the mast assembly 718 may first be collapsed such that the mast assembly 718 is in a collapsed position. Next, the mast assembly 718 may be rotated relative to the base module 714, causing the mast assembly 718 to extend along the axis A7. Lastly, the mast assembly 718 may be slid into the base module 714 such that the mast assembly 718 is surrounded by the housing 726 and at least partially received within the cavity 734 through the aperture 1707 and the lighting element 765 is positioned adjacent the fourth side 758. While in the storage position, the lighting element 765 may be oriented outward and away from the base module 714 as shown in FIG. 1A. This orientation allows for the lighting element 765 to be illuminated for use when in the storage position. Alternatively, the lighting element 765 may be oriented toward the base module 714 to protect the lighting element 165 when the mast assembly 718 is in the storage configuration.

As shown in FIG. 7B, the base module 714 may include one or more drawers 1704 on a first side 752 of the base module 714. A charger 1708, such as a USB charger, may be housed within the drawer 1704. The charger 1708 may be used to charge an external device, such as a user's phone, from the same power source that supplies power to the lighting element 165. Wiring for the charger 1708 may extend form and retract into the base module 714 as the drawer 1704 is opened and closed.

Figure 8:
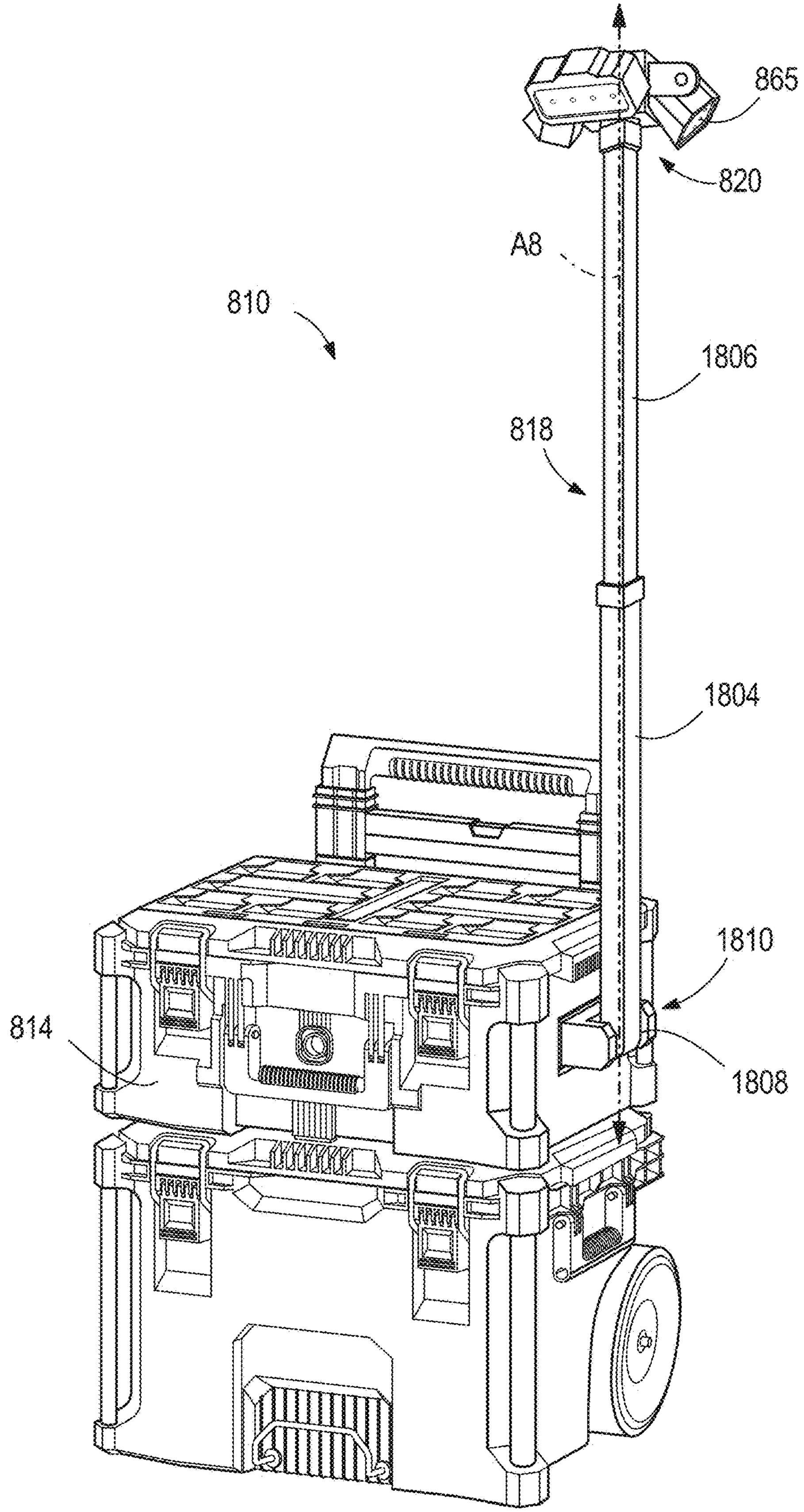
FIG. 8 is a perspective view of a light assembly according to an eighth embodiment.

FIG. 8 illustrates a light assembly 810 according to another embodiment of the disclosure. The light assembly 810 is like the light assembly 110 shown in FIG. 1A and described above. Therefore, like features are identified with like references numerals plus "700", and only the differences between the two will be discussed.

The illustrated light assembly 810 includes a base module 814 supported on a surface, a mast assembly 818 extending upward from the base module 814 to a distal end 820, and a lighting element 865 coupled to the distal end 820 of the mast assembly 818. The lighting element 865 includes one or more lighting elements, such as LEDs, light bulbs, or the like, to provide light to an area. The light assembly 810 is movable between a first, or operating, configuration and a second, or storage, configuration. The storage configuration may also be referred to as a closed configuration or transport configuration. The operating configuration may also be referred to as an extended configuration or working configuration. In the operating configuration, the mast assembly 818 extends from the base module 814, and the lighting element 865 provides illumination to an area.

The illustrated mast assembly 818 is telescoping. In the present embodiment, the mast assembly 818 includes a first pole 1804 and a second pole 1806. In other embodiments, the mast assembly 818 may include fewer or more poles. A first or proximal end of the mast assembly 818 is coupled via a hinge 1808 to a side 1810 of the base module 814. The second or distal end 820 of the mast assembly 818 is coupled with the lighting element 865.

To reach the operating configuration, the mast assembly 818 is configured to telescope upward along the axis A8 such that the mast assembly 818 is in an extended position. The mast assembly 818 extends approximately 7 feet or about 2.1 meters when in the extended position. To return the mast assembly 818 to the storage configuration, the mast assembly 818 is collapsed and the mast assembly 818 extends along the side 1810. This orientation allows for the lighting element 865 to be illuminated for use when in the storage position. The mast assembly 818 extends approximately 3 feet or about 1 meter when in the collapsed position.

Figure 9A:
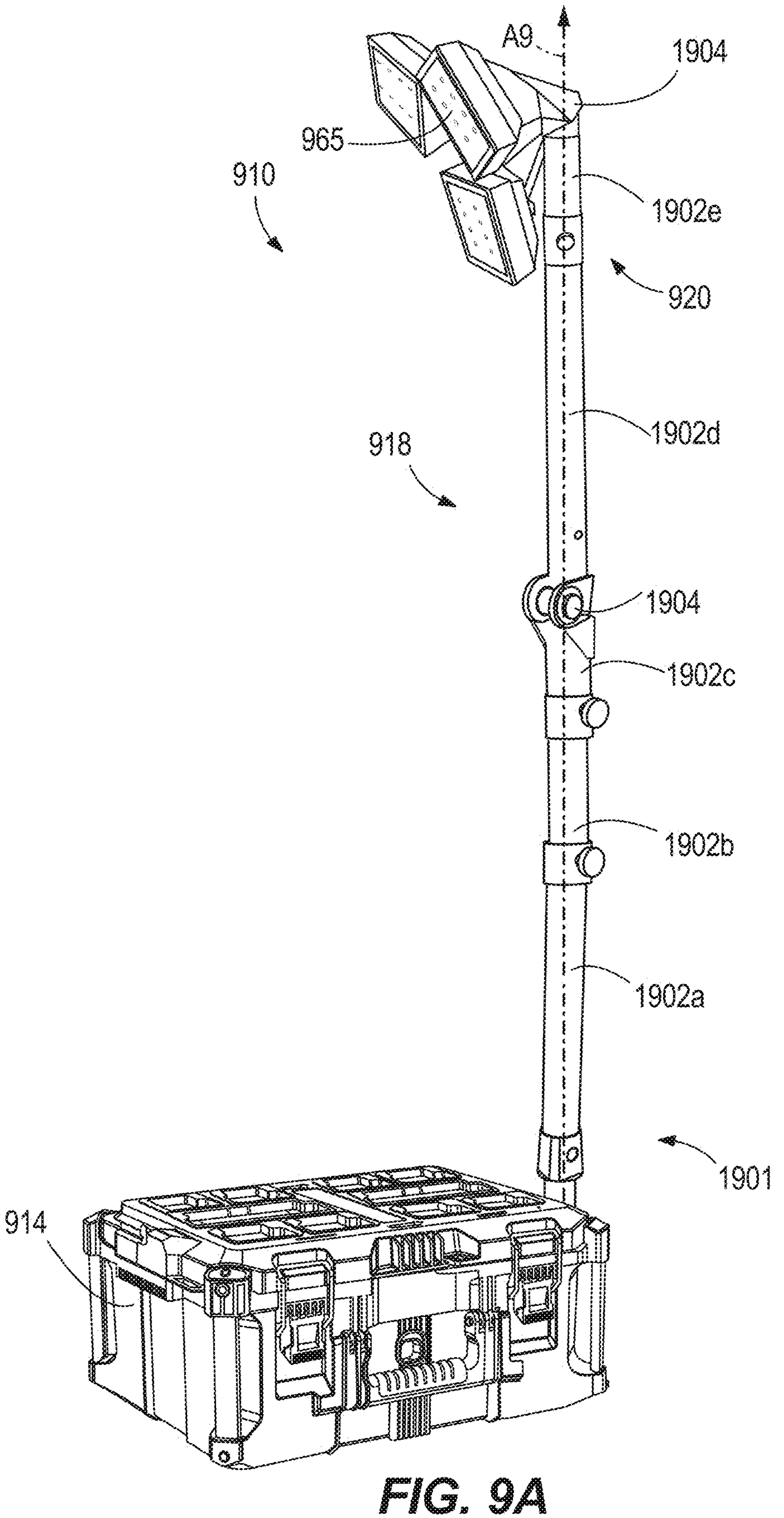
FIG. 9A is a perspective view of a light assembly according to a ninth embodiment.
Figure 9B:
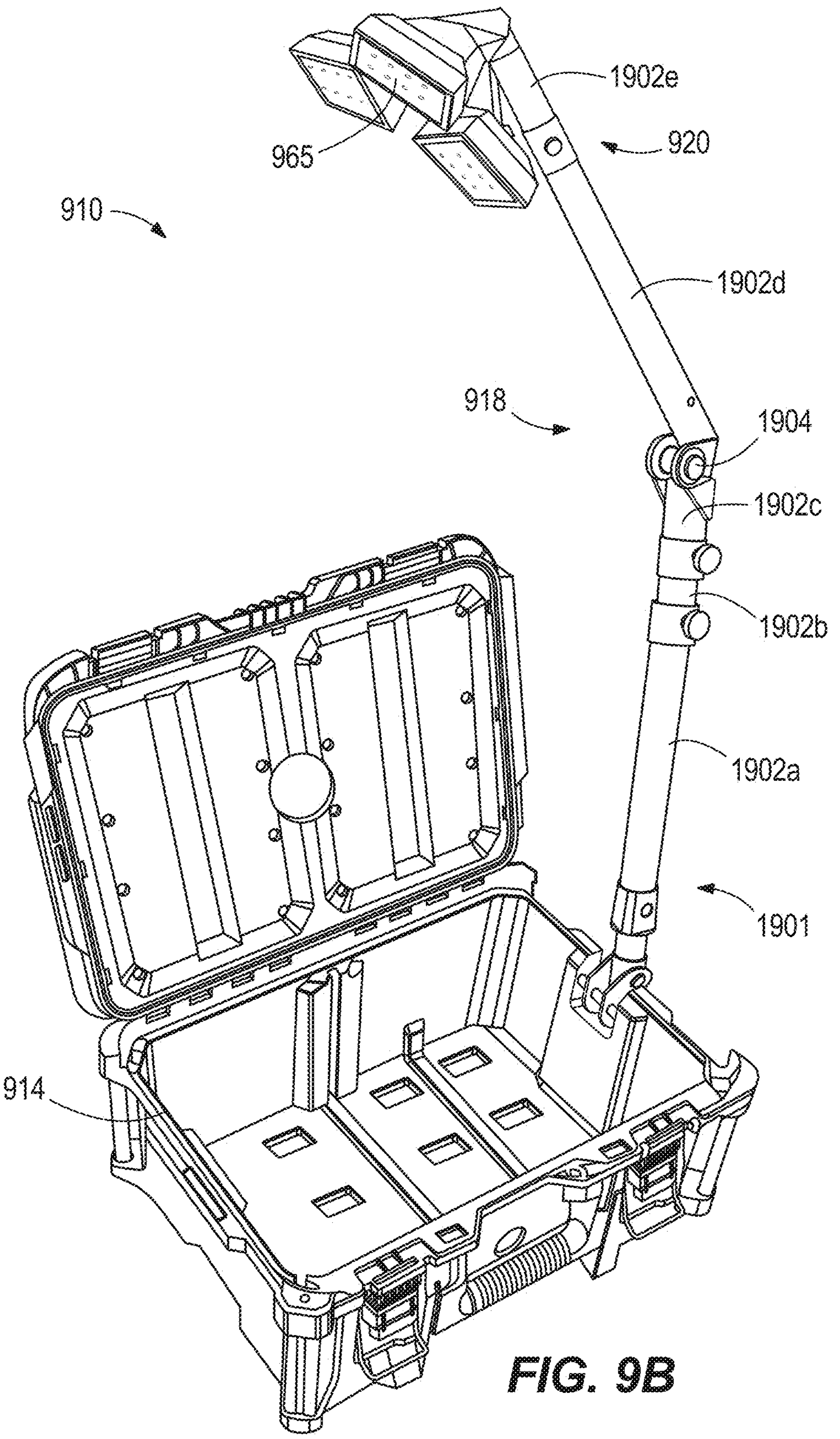
FIG. 9B is another perspective view of the light assembly of FIG. 9A.

FIGS. 9A and 9B illustrate a light assembly 910 according to another embodiment of the disclosure. The light assembly 910 is like the light assembly 110 shown in FIG. 1A and described above. Therefore, like features are identified with like references numerals plus "800", and only the differences between the two will be discussed.

The illustrated light assembly 910 includes a base module 914 supported on a surface, a mast assembly 918 extending upward from the base module 914, and a lighting element 965 coupled to a distal end 920 of the mast assembly 918. The lighting element 965 includes one or more lighting elements, such as LEDs, light bulbs, or the like, to provide light to an area. The light assembly 910 is movable between a first, or operating, configuration and a second, or storage, configuration. The storage configuration may also be referred to as a closed configuration or transport configuration. The operating configuration may also be referred to as an extended configuration or working configuration. In the operating configuration, the mast assembly 918 extends from the base module 914, and the lighting element 965 provides illumination to an area.

In the embodiment of FIGS. 9A and 9B, the mast assembly 918 includes a first telescoping segment 1901 and a second telescoping segment 1906. The first telescoping segment 1901 includes a first pole 1902*a*, a second pole 1902*b*, and a third pole 1902*c*. The second telescoping segment 1906 includes a fourth pole 1902*d* and a fifth pole 1902*e*. Each of the poles 1902*a-e* has a first or proximal end and a second or distal end. The proximal end of the first pole 1902*a* is attached to the base 914. The first pole 1902*a* has a larger diameter than the second pole 1902*b* such that the first pole 1902*a* may receive the second pole 1902*b*. The second pole 1902*b* has a larger diameter than the third pole 1902*c* such that the second pole 1902*b* may receive the third pole 1902*c*. As such, the first, second, and third poles 1902*a-c* may telescope relative to each other to change a length of the mast assembly 918. The distal end of the third pole 1902*c* is coupled with the proximal end of the fourth pole 1902*d* by a hinge 1904. The fourth pole 1902*d* has a larger diameter than the fifth pole 1902*e* such that the fourth pole 1902*d* may receive the fifth pole 1902*e*. As such, the fourth and fifth poles 1902*d, e* may telescope relative to each other to change a length of the mast assembly 918. The distal end of the fourth pole 1902*d* is coupled with the lighting element 965.

To reach the operating configuration, the second pole 1902*b*, the third pole 1902*c*, the fourth pole 1902*d*, and the fifth pole 1902*e* are each telescoped upward to extend straight up along an axis A9 defined by the first pole 1902*a*. The hinge 1904 is rotatable 180 degrees, allowing the mast assembly 918 to unfold while in the working configuration. The hinge 1904 is configured to lock at 0 degrees, or when the first telescoping segment 1901 and the second telescoping segment 1906 extend straight (i.e., when in the working configuration) to inhibit the second telescoping segment 1906 from freely rotating.

To reach the storage configuration, the fifth pole 1902*e* collapses into and is received by the fourth pole 1902*d*. Next, the third pole 1902*c* collapses into and is received by the second pole 1902*b*. Lastly, the second pole 1902*b* collapses into and is received by the first pole 1902*a*. In other words, when in the storage configuration, the poles 1902*a-c* collapse in a telescoping style such that the second pole 1902*b* and the third pole 1902*c* are surrounded by the first pole 1902*a*. Optionally, if a user would like for the mast assembly 918 to be further collapsed, the second telescoping segment 1906 may be rotated by 180 degrees about the hinge 1904 such that the second telescoping segment 1906 folds and extends along the first telescoping segment 1901.

FIGS. 10A-10E illustrate another light assembly 1010. The illustrated light assembly 1010 includes a housing 1026, a mast assembly 1018 extending upward from the base module 1014, and a lighting element 1065 coupled to a distal end 1020 of the mast assembly 1018. The lighting element 1065 includes one or more lighting elements, such as LEDs, light bulbs, or the like, to provide light to an area. The light assembly 1010 is movable between a first, or operating, configuration and a second, or storage, configuration. The storage configuration may also be referred to as a closed configuration or transport configuration. The operating configuration may also be referred to as an extended configuration or working configuration. In the operating configuration, the mast assembly 1018 extends from the base module 1014, and the lighting element 1065 provides illumination to an area.

The base module 1014 includes a housing 1026. The illustrated housing 1026 is generally L-shaped and includes a top side 1028, a back side 1030, and a bottom side 1060. The base module 1014 also includes a first set of coupling components 2036 positioned on the bottom side 1060 of the housing 1026. The first set of coupling components 2036 is configured to interface with corresponding coupling components on a surface of any other modular storage units to couple the light assembly 1010 to the other modular storage units (e.g., a dolly, a tool box, a wall mount or plate, etc.). The base module 1014 further includes a second set of coupling components 2038 on the top side 1028 of the housing 1026. The second set of coupling components 2038 is configured to interface with corresponding coupling components on the mast assembly 1018 or with another modular storage unit. The base module 1014 also includes a third set of coupling components 2040 on the back side 1030 of the housing 1026. The third set of coupling components 2040 is configured to interface with corresponding coupling components on a surface of another modular storage units. The coupling components 2036, 2038, 2040 on the housing 1026 have complementary configurations to coupling components on other modular storage units. For example, in the present embodiment, the first set of coupling components 2036 includes two cleats, the second set of coupling components 2038 includes two recesses, and the third set of coupling components 2040 includes two cleats. In other embodiments, the coupling components 2036, 2038, 2040 may have other structures or configurations. Additionally or alternatively, each set of coupling components 2036, 2038, 2040 may include more than two features or less than two features.

Figure 10A:
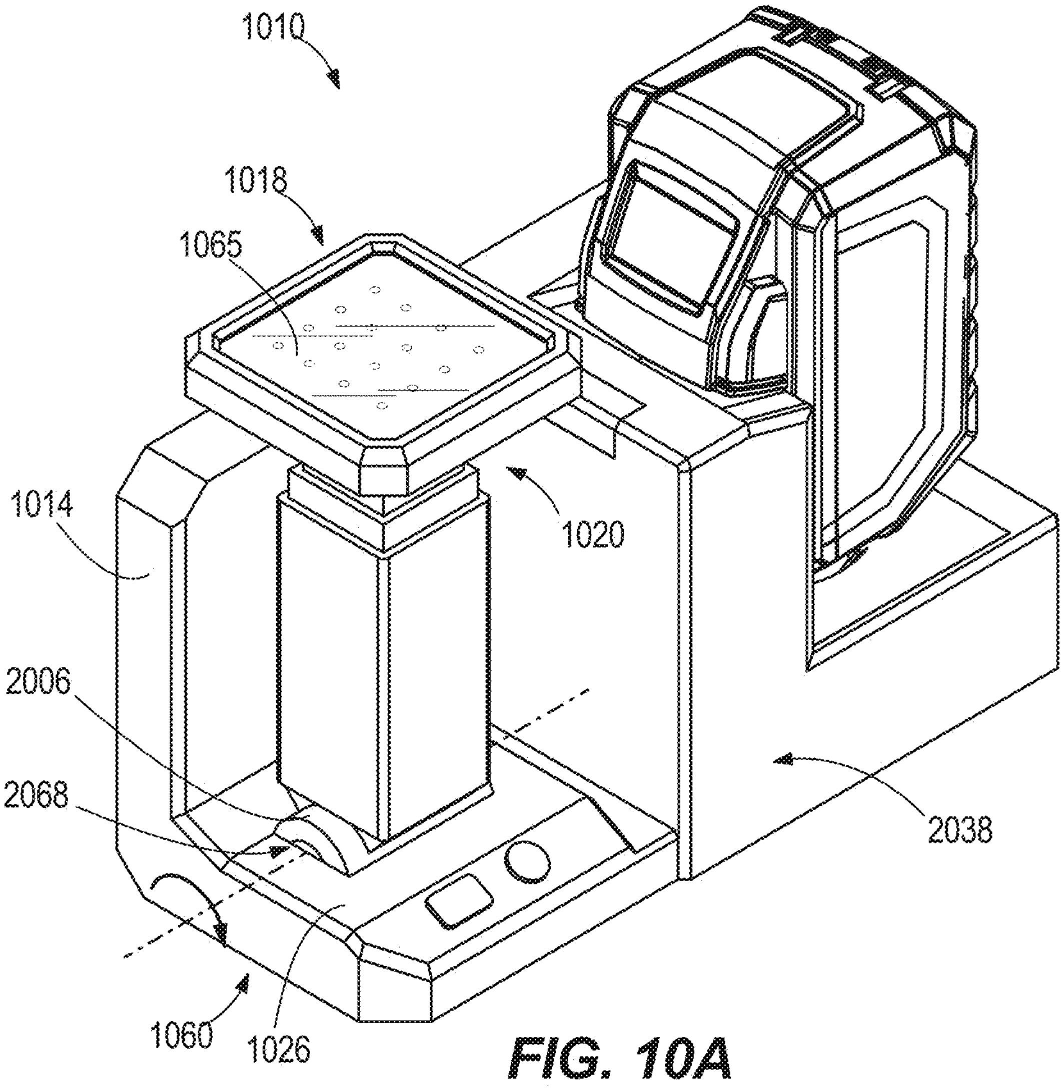
FIG. 10A is a perspective view of a light assembly according to a tenth embodiment.
Figure 10B:
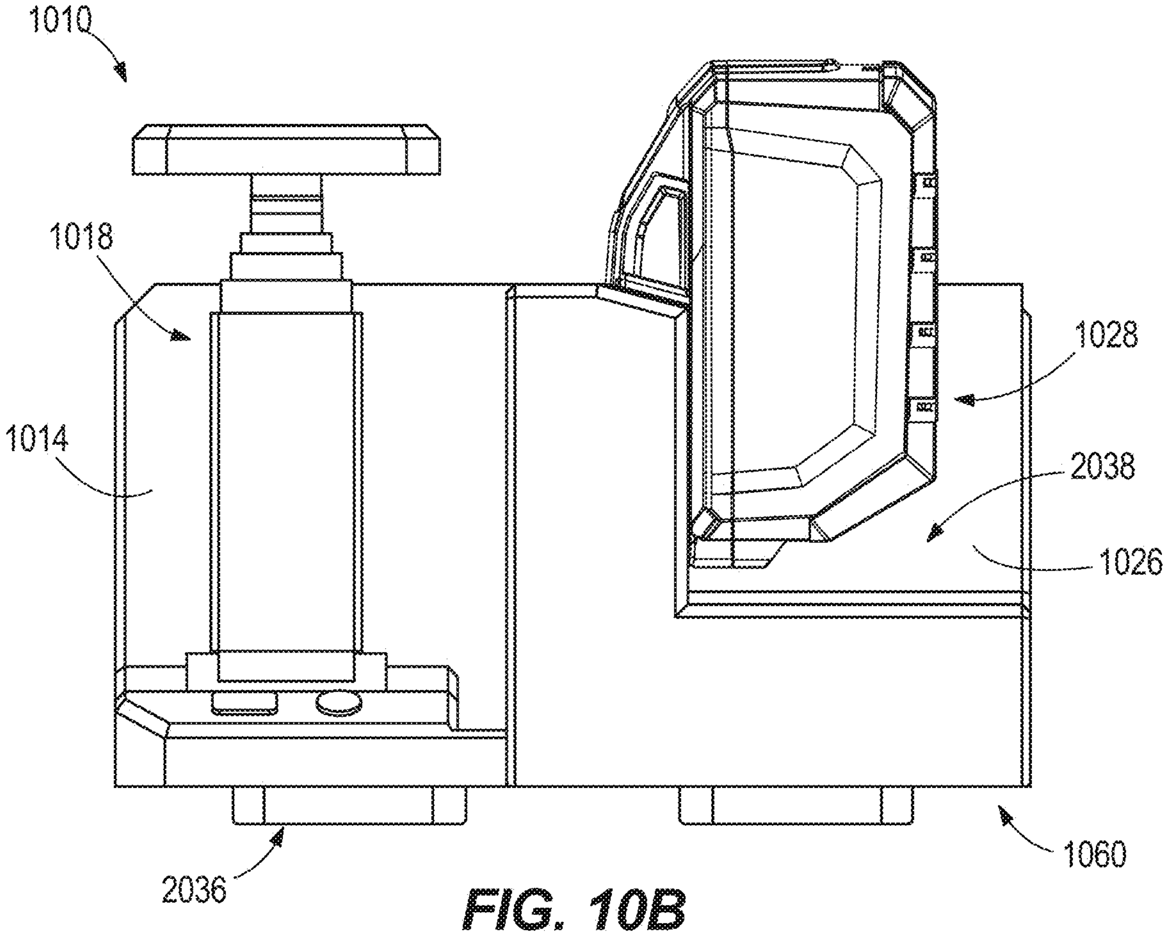
FIG. 10B is a front plan view of the light assembly of FIG. 10A.
Figure 10C:
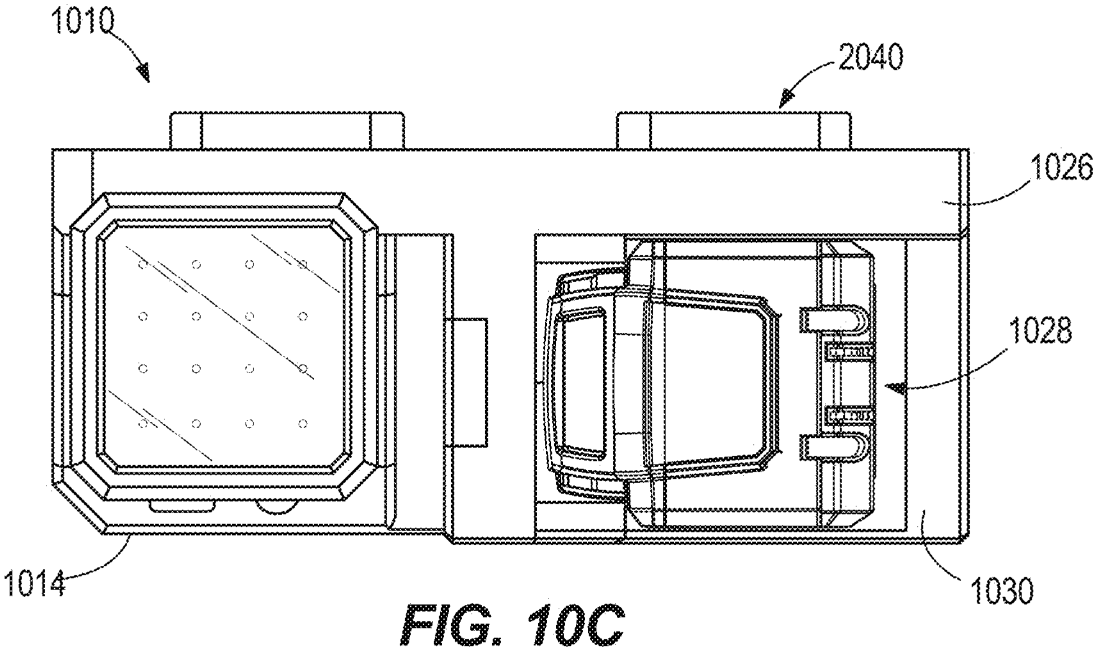
FIG. 10C is a top plan view of the light assembly of FIG. 10A.
Figure 10D:
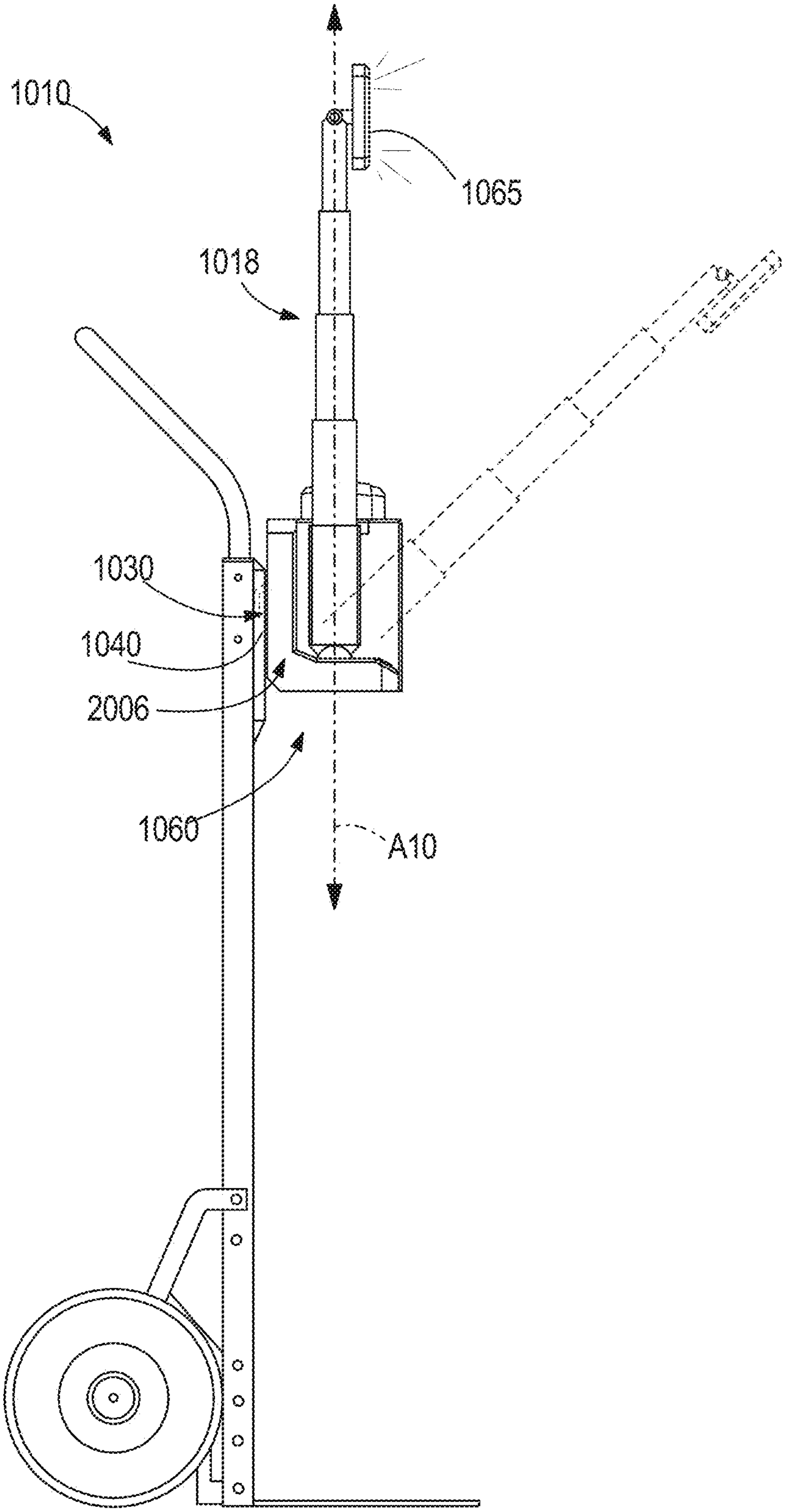
FIG. 10D is a side view of the light assembly of FIG. 10A connected to a hand truck.
Figure 10E:
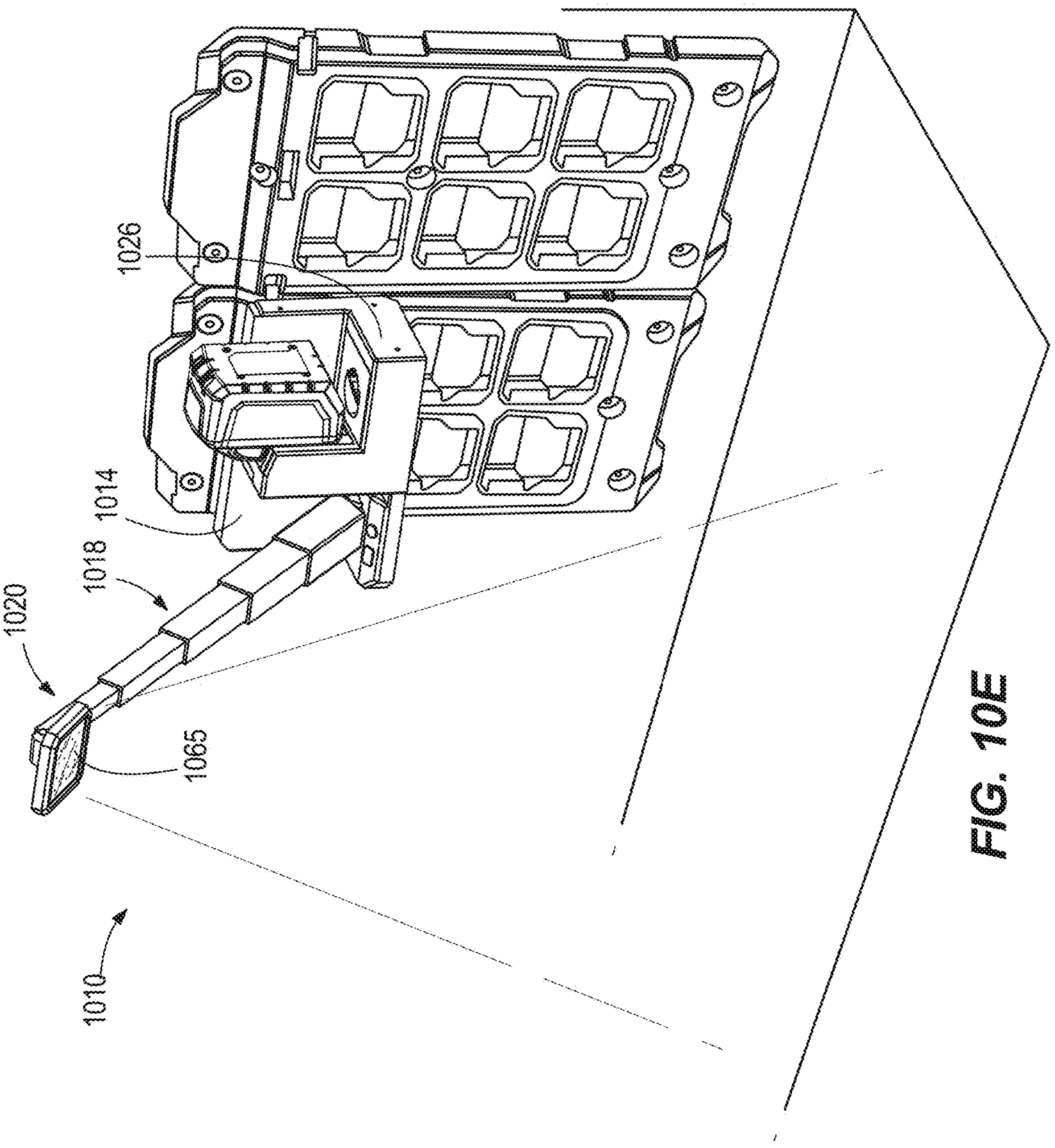
FIG. 10E is a perspective view of the light assembly of FIG. 10A connected to a wall mount.

The mast assembly 1018 is disposed on and connected with one of the recesses of the second set of coupling components 2038, but may alternatively be connected to another coupling component or may be integral with the base module 1014. While the mast assembly 1018 is supported on the base module 1014, the base module 1014 may be coupled to another modular storage unit by one of the coupling components 2036, 2038, 2040. For example, as shown in FIG. 10D, the base module 1014 is coupled to a dolly using the third set of coupling components 1040. In this scenario, the light assembly 1010 may move with the dolly to illuminate an area around the dolly. As shown in FIG. 10E, the base module 1014 is coupled to a wall mount or wall plate using the third set of coupling components 1040. In this scenario, the light assembly 1010 may illuminate an area around the wall mount or wall plate, such as a workbench. In other scenarios, the base module 1014 may be connected to other modular storage units using other coupling components. For example, the base module 1014 may be coupled on top of a tool box using the first set of coupling components 2036. In any scenario, the second set of coupling components 2038 may be accessed to mount (e.g., stack) other modular units, such as a second mast assembly, a small tool box or storage container, or the like.

In the embodiment of FIGS. 10A-10E, the mast assembly 1018 is telescoping. The mast assembly 1018 may include a plurality of poles, similar to the mast assembly 118 of FIG. 1A. A first or proximal end 2068 of the mast assembly 1018 is attached by a hinge 2006 to the base 1014. The second or distal end 1020 of the mast assembly 1018 is coupled with the lighting element 1065.

To reach the operating configuration, the mast assembly 1018 is configured to telescope upward along the axis A10 such that the mast assembly 1018 is in an extended position. The hinge 2006 may be rotatable, for example, 45 degrees to illuminate various areas of a workspace for a user. The hinge 2006 is configured to lock at 0 degrees, or when the mast assembly 1018 extends straight upward along axis A10 (i.e., when in the working configuration) to inhibit the mast assembly 1018 from freely rotating. Additionally, the hinge 2006 is configured to lock at 45 degrees to prevent the mast assembly 1018 from freely rotating. In the storage configuration, the mast assembly 1018 is collapsed such that the mast assembly 1018 is in a collapse position.

Although the disclosure has been described in detail with reference to certain preferred embodiments, variations and modifications exist within the scope and spirit of one or more independent aspects of the disclosure as described. Various features and advantages are set forth in the following claims.

What is claimed is:

1. A light assembly comprising:

a stackable storage case including a housing defining a cavity and including a first side, a second side, a third side, and a fourth side having an aperture extending therethrough;

a mast assembly extending between a first end and a second end, the first end coupled to the housing; and a lighting element coupled to the second end of the mast assembly;

wherein the mast assembly includes a plurality of telescoping poles and is adjustable between:

an operating configuration, in which the mast assembly extends outwardly from the stackable storage case along a vertical axis, and a storage configuration, in which the mast assembly extends along a horizontal axis that is substantially orthogonal to the vertical axis, the mast assembly is at least partially received within the cavity through the aperture and the lighting element is positioned adjacent the fourth side, and wherein the stackable storage case also includes a top surface with a plurality of coupling components that couple the stackable storage case to a bottom surface of a stackable storage unit.

2. The light assembly of claim 1, wherein in the storage configuration, the lighting element is oriented outward and away from the stackable storage case.

3. The light assembly of claim 1, wherein the lighting element is able to be illuminated when in the storage configuration.

4. The light assembly of claim 1, wherein the mast assembly is configured to telescope upward along the vertical axis such that the mast assembly is in an extended position, and wherein the mast assembly extends about 2.1 meters when in the extended position.

5. The light assembly of claim 1, wherein the mast assembly is attached to the stackable storage case by a hinge.

6. The light assembly of claim 5, wherein the hinge is configured to lock the mast assembly to inhibit rotation of the mast assembly.

7. The light assembly of claim 1, wherein the stackable storage case further includes a drawer disposed on the first side of the housing.

8. The light assembly of claim 7, wherein the drawer includes a charger configured to charge an external device.

9. The light assembly of claim 1, wherein the lighting element includes one or more lighting elements.

10. The light assembly of claim 1, wherein the lighting element is outside of the housing in the storage configuration.

11. The light assembly of claim 1, wherein the coupling components are cleats or recesses.

12. The light assembly of claim 1, wherein the stackable storage case further includes a cover that forms the top surface.

13. The light assembly of claim 12, wherein the cover is movable relative to the housing to provide access to the cavity.

14. A light assembly comprising:

a stackable storage case including a housing defining a cavity and including a first side, a second side, a third side, and a fourth side having an aperture extending therethrough;

a mast assembly extending between a first end and a second end, the first end coupled to the housing; and a lighting element coupled to the second end of the mast assembly;

wherein the mast assembly includes a plurality of telescoping poles and is adjustable between:

an operating configuration, in which the mast assembly extends outwardly from the stackable storage case along a vertical axis, and a storage configuration, in which the mast assembly extends along a horizontal axis that is substantially orthogonal to the vertical axis, the mast assembly is at least partially received within the cavity through the aperture and the lighting element is positioned adjacent the fourth side, and wherein the mast assembly is configured to telescope upward along the vertical axis such that the mast assembly is in an extended position, and wherein the mast assembly extends about 2.1 meters when in the extended position.

15. A light assembly comprising:

a stackable storage case including a housing defining a cavity and including a first side, a second side, a third side, and a fourth side having an aperture extending therethrough;

a mast assembly extending between a first end and a second end, the first end coupled to the housing; and a lighting element coupled to the second end of the mast assembly;

wherein the mast assembly includes a plurality of telescoping poles and is adjustable between:

an operating configuration, in which the mast assembly extends outwardly from the stackable storage case along a vertical axis, and a storage configuration, in which the mast assembly extends along a horizontal axis that is substantially orthogonal to the vertical axis, the mast assembly is at least partially received within the cavity through the aperture and the lighting element is positioned adjacent the fourth side, and wherein the stackable storage case further includes a drawer disposed on the first side of the housing.

* * * * *